(12) United States Patent
Lai et al.

(10) Patent No.: US 12,557,116 B2
(45) Date of Patent: Feb. 17, 2026

(54) USER EQUIPMENT AND METHOD FOR POWER SAVING

(71) Applicant: SHARP KABUSHIKI KAISHA, Sakai (JP)

(72) Inventors: Chia-Hsin Lai, Taipei (TW); Hsin-Hsi Tsai, Taipei (TW); Hai-Han Wang, Taipei (TW); Mei-Ju Shih, Taipei (TW); Chia-Hao Yu, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 343 days.

(21) Appl. No.: 18/033,301

(22) PCT Filed: Oct. 22, 2021

(86) PCT No.: PCT/CN2021/125863
§ 371 (c)(1),
(2) Date: Apr. 21, 2023

(87) PCT Pub. No.: WO2022/083761
PCT Pub. Date: Apr. 28, 2022

(65) Prior Publication Data
US 2023/0397224 A1 Dec. 7, 2023

Related U.S. Application Data

(60) Provisional application No. 63/104,457, filed on Oct. 22, 2020.

(51) Int. Cl.
*H04W 72/232* (2023.01)
*H04L 27/26* (2006.01)
*H04W 76/20* (2018.01)

(52) U.S. Cl.
CPC ..... *H04W 72/232* (2023.01); *H04L 27/26025* (2021.01); *H04W 76/20* (2018.02)

(58) Field of Classification Search
CPC . H04W 72/232; H04W 7/20; H04W 52/0216; H04W 52/028; H04W 52/0229; H04L 27/26025
See application file for complete search history.

(56) References Cited

U.S. PATENT DOCUMENTS

2020/0314747 A1* 10/2020 Zhou ............... H04W 76/15
2020/0350967 A1* 11/2020 Xu .................. H04L 5/0051
2020/0389874 A1* 12/2020 Lin ................. H04L 5/0053

FOREIGN PATENT DOCUMENTS

WO 2020102146 A2 5/2020

OTHER PUBLICATIONS

3GPP TS 38.213 V16.3.0 (Sep. 2020), 3rd Generation Partnership Project; Technical Specification Group Radio Access Network; NR; Physical layer procedures for control (Release 16), section 10.
(Continued)

*Primary Examiner* — Jamal Javaid
(74) *Attorney, Agent, or Firm* — ScienBiziP, P.C.

(57) ABSTRACT

A user equipment (UE) and a method for power saving are provided. The method includes receiving a configuration indicating a plurality of search space set groups (SSSGs) that includes a first SSSG and one or more second SSSGs, the first SSSG being associated with a first SSSG identifier (ID); receiving downlink control information (DCI) on a physical downlink control channel (PDCCH) while monitoring the PDCCH on a UE-specific search space, the DCI including an information field indicating a value associated with the first SSSG ID; and starting PDCCH monitoring in the first SSSG and stopping PDCCH monitoring in the one or more second SSSGs from a slot that is at least a time offset after the last symbol of the DCI.

12 Claims, 7 Drawing Sheets

100

(56) References Cited

OTHER PUBLICATIONS

Ericsson, "UE power saving using search space set switching", R1-2004360, 3GPP TSG RAN WG1 #101-e, e-Meeting, May 25-Jun. 5, 2020, Sections 1-2.
Apple Inc., "Remaining issues of DL signals and channels", R1-2002320, 3GPP TSG-RAN WG1 #100b-eMeeting, Apr. 20-30, 2020, Section 2.
LG Electronics, "Remaining issues of DL signals and channels for NR-U", R1-2004011, 3GPP TSG RAN WG1 #101, e-Meeting, May 25-Jun. 5, 2020.
3GPP TS 38.212 V16.2.0 (Jun. 2020), 3rd Generation Partnership Project; Technical Specification Group Radio Access Network; NR; Multiplexing and channel coding (Release 16).
3GPP TS 38.213 V16.2.0 (Jun. 2020), 3rd Generation Partnership Project; Technical Specification Group Radio Access Network; NR; Physical layer procedures for control (Release 16).
3GPP TS 38.321 V16.1.0 (Jul. 2020), 3rd Generation Partnership Project; Technical Specification Group Radio Access Network; NR; Medium Access Control (MAC) protocol specification (Release 16).
3GPP TS 38.331 V16.1.0 (Jul. 2020), 3rd Generation Partnership Project; Technical Specification Group Radio Access Network; NR; Radio Resource Control (RRC) protocol specification (Release 16).
MediaTek Inc., "New WID: UE Power Saving Enhancements", RP-193239, 3GPP TSG RAN Meeting #86, Sitges, Spain, Dec. 9-12, 2019.

* cited by examiner

USER EQUIPMENT AND METHOD FOR POWER SAVING

CROSS-REFERENCE TO RELATED APPLICATION(S)

This application is a National Stage Application of International Patent Application Serial No. PCT/CN2021/125863, filed on Oct. 22, 2021, which claims the benefit of and priority to U.S. Provisional Patent Application Ser. No. 63/104,457, filed on Oct. 22, 2020, the contents of all of which are hereby incorporated herein fully by reference for all purposes.

FIELD

The present disclosure is related to wireless communication, and more particularly, to a method for power saving in cellular wireless communication networks.

BACKGROUND

The acronyms in the present application are defined as follows and unless otherwise specified, the acronyms have the following meanings:

Abbreviation Full name
3GPP 3$^{rd}$ Generation Partnership Project
5G 5$^{th}$ Generation
5GC 5G Core
AS Access Stratum
BA Bandwidth Adaptation
BS Base Station
BWP Bandwidth Part
CA Carrier Aggregation
CE Control Element
CN Core Network
CORESET Control Resource Set
CRC Cyclic Redundancy Check
CSI Channel State Information
CSS Common Search Space
DC Dual Connectivity
DCI Downlink Control Information
DCP DCI with CRC scrambled by PS-RNTI
DL Downlink
DRB Data Radio Bearer
DRX Discontinuous Reception
E-UTRA(N) Evolved Universal Terrestrial Radio Access (Network)
EPC Evolved Packet Core
FR Frequency Range
HARQ Hybrid Automatic Repeat reQuest
ID Identifier/Identity/Identification
IE Information Element
LAN Local Area Network
LSB Least Significant Bit
LTE Long Term Evolution
MAC Medium Access Control
MAC CE MAC Control Element
MCG Master Cell Group
MIB Master Information Block
MN Master Node
MSB Most Significant Bit
MSG Message
NAS Non-Access Stratum
NE-DC NR—E-UTRA Dual Connectivity
NR New Radio
NR-U NR Unlicensed
NW Network
PCell Primary Cell
PDCCH Physical Downlink Control Channel
PDCP Packet Data Convergence Protocol
PDSCH Physical Downlink Shared Channel
PDU Protocol Data Unit
PHY Physical (layer)
PLMN Public Land Mobile Network
PRACH Physical Random Access Channel
PS-RNTI Power Saving RNTI
PSCell Primary SCG Cell/Primary Secondary Cell
PUCCH Physical Uplink Control Channel
PUSCH Physical Uplink Shared Channel
QoS Quality of Service
RA Random Access
RAN Radio Access Network
RAR Random Access Response
RAT Radio Access Technology
Rel Release
RF Radio Frequency
RLC Radio Link Control
RNTI Radio Network Temporary Identifier
RRC Radio Resource Control
RS Reference Signal
SCell Secondary Cell
SCG Secondary Cell Group
SCS Subcarrier Spacing
SDAP Service Data Adaptation Protocol
SI System Information
SIB System Information Block
SL Sidelink
SN Secondary Node
SPS Semi-Persistent Scheduling
SRB Signaling Radio Bearer
SS Search Space
SSSG Search Space Set Group
TRP Transmission/Reception Point
TS Technical Specification
UE User Equipment
UL Uplink
USS UE-specific Search Space
V2X Vehicle-to-Everything With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a method performed by a UE in cellular wireless communication network for power saving.

In a first aspect of the present application, a method for power saving performed by a UE is provided. The method includes receiving a configuration indicating a plurality of SSSGs that includes a first SSSG and one or more second SSSGs, the first SSSG being associated with a first SSSG ID; receiving DCI on a PDCCH while monitoring the PDCCH on a UE-specific search space, the DCI including an information field indicating a value associated with the first SSSG ID; and starting PDCCH monitoring in the first SSSG and stopping PDCCH monitoring in the one or more second SSSGs from a slot that is at least a time offset after the last symbol of the DCI.

In an implementation of the first aspect, the DCI comprises one of a DCI format 0_1, a DC format 1_1, a DC format 0_2, and a DC format 1_2.

In another implementation of the first aspect, the method further includes starting or restarting a timer upon receiving the DCI; and starting PDCCH monitoring in an SSSG associated with ID 0 upon expiration of the timer.

In another implementation of the first aspect, a SCS associated with the time offset is determined by an SCS of a serving cell in which the DCI is received.

In another implementation of the first aspect, a unit of the time offset is symbol.

In another implementation of the first aspect, the information field has n bits; and n is a positive integer determined according to a radio resource control (RRC) parameter associated with SSSG switching.

In another implementation of the first aspect, the information field has n bits; n is a positive integer determined according to a number of configured SSSGs.

In a second aspect, a UE for power saving is provided. The UE includes one or more processors and at least one memory coupled to at least one of the one or more processors, where the at least one memory stores computer-executable instructions that, when executed by the at least one of the one or more processors, cause the UE to receive a configuration indicating a plurality of SSSGs that includes a first SSSG and one or more second SSSGs, the first SSSG being associated with a first SSSG ID; receive DCI on a PDCCH while monitoring the PDCCH on a UE-specific search space, the DCI including an information field indicating a value associated with the first SSSG ID; and start PDCCH monitoring in the first SSSG and stop PDCCH monitoring in the one or more second SSSGs from a slot that is at least a time offset after the last symbol of the DCI.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

DESCRIPTION

Figure 1:
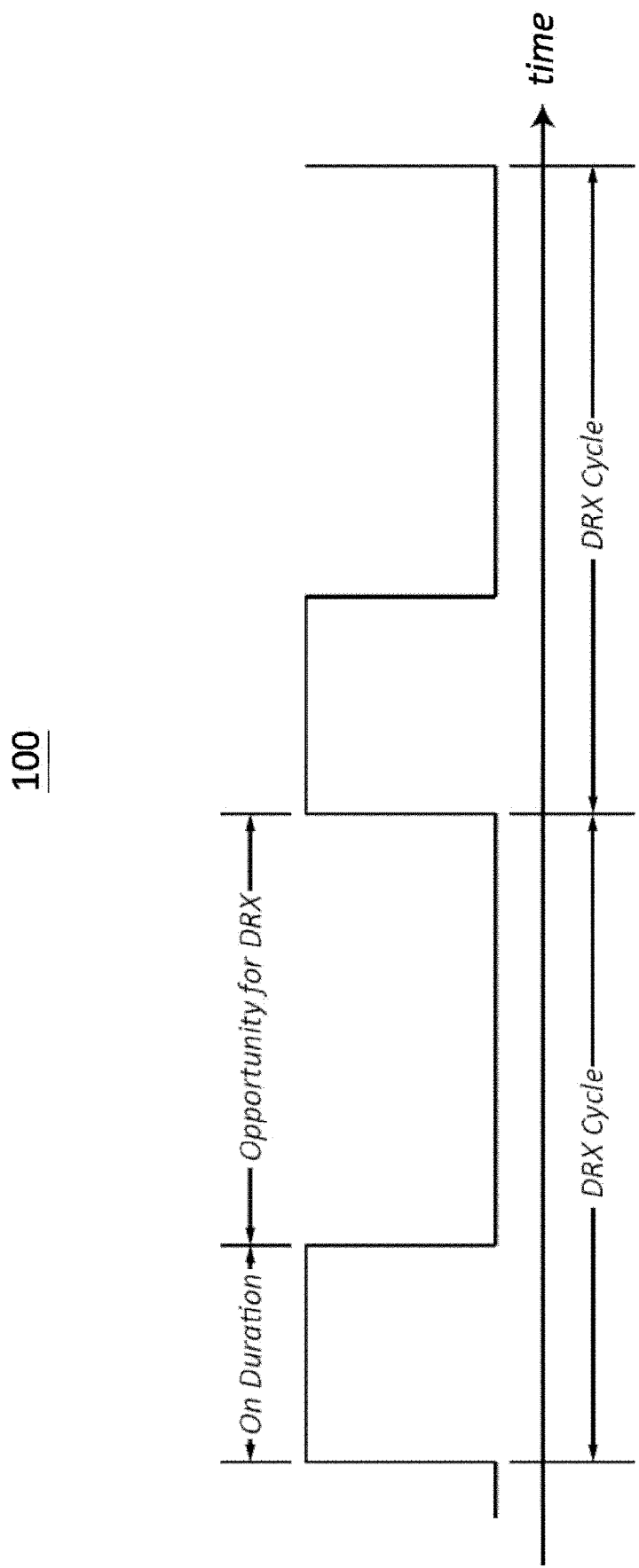
FIG. 1 illustrates a timing diagram of a DRX operation according to an example implementation of the present disclosure.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one BS, at least one UE, and one or more optional network elements that provide connection within a network. The UE communicates with the network such as a Core Network (CN), an Evolved Packet Core (EPC) network, an Evolved Universal Terrestrial RAN (E-UTRA), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

A BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via one or more radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) (e.g., (ProSe) direct communication services and (ProSe) direct discovery services) or V2X services (e.g., E-UTRA V2X sidelink communication services) or sidelink service (e.g., NR sidelink communication services). Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. Sidelink resources may also be provided in an NR frame to support ProSe services, V2X services (e.g., E-UTRA V2X sidelink communication services) or sidelink services (e.g., NR sidelink communication services). In contrast, sidelink resources may also be provided in an E-UTRA frame to support ProSe services, V2X services (e.g., E-UTRA V2X sidelink communication services) or sidelink services (e.g., NR sidelink communication services).

Any two or more than two of the following sentences, paragraphs, (sub)-bullets, points, actions, behaviors, terms, alternatives, aspects, examples, or claims described in the present disclosure may be combined logically, reasonably, and properly to form a specific method.

Any sentence, paragraph, (sub)-bullet, point, action, behaviors, terms, alternatives, aspects, examples, or claims described in the present disclosure may be implemented independently and separately to form a specific method.

Dependency, e.g., "based on", "more specifically", "preferably", "in one embodiment", "in one alternative", "in one example", "in one aspect", "in one implementation", "in some implementations", etc., in the present disclosure is just one possible example which would not restrict the specific method.

One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc.

In NR-U, search space set group (SSSG) switching may allow the network (NW) to dynamically switch the search space set by DCI format 2_0. However, since DCI format 2_0 is transmitted in the CSS, which is not UE-specific and is used for transmitting slot format indication, it may be more flexible if a DCI format for SSSG switching is transmitted in the USS in a UE-specific manner and/or transmitted by a specific DCI format, such as DCI format 0_1, DCI format 1_1, and DCI format 2_6, but not limited thereto, which may be tailored for power saving indication.

Examples of some selected terms are provided as follows.

User Equipment (UE): The UE may be referred to as PHY/MAC/RLC/PDCP/SDAP entity. The PHY/MAC/RLC/PDCP/SDAP entity may be referred to as the UE.

Network (NW): The NW may be a network node, a TRP, a cell (e.g., SpCell (Special Cell), PCell, PSCell, and/or SCell), an eNB, a gNB, and/or a base station.

Serving Cell: A PCell, a PSCell, or an SCell. The serving cell may be an activated or a deactivated serving cell.

Special Cell (SpCell): For a Dual Connectivity operation, the term Special Cell refers to the PCell of the MCG or the PSCell of the SCG depending on whether the MAC entity is associated with the MCG or the SCG, respectively. Otherwise, the term Special Cell refers to the PCell. A Special Cell supports PUCCH transmission and contention-based Random Access and is always activated.

UE Power Saving

The PDCCH monitoring activity of the UE in RRC connected mode may be governed by DRX, BA, DCP, etc.

FIG. 1 illustrates a timing diagram 100 of a DRX operation according to an example implementation of the present disclosure. When DRX is configured, the UE does not have to continuously monitor PDCCH. DRX may be characterized by the following:

(DRX) on-duration: duration in which the UE waits, after waking up, to receive PDCCHs. If the UE successfully decodes a PDCCH, the UE stays awake and starts the inactivity timer;

(DRX) inactivity-timer: duration in which the UE waits to successfully decode a PDCCH, from the last successful decoding of a PDCCH. If the UE fails to decode the PDCCH, the UE may go back to sleep. The UE may restart the inactivity timer following a single successful decoding of a PDCCH for a first transmission only (e.g., not for retransmissions);

(DRX) retransmission-timer: duration after which a retransmission can be expected;

(DRX) cycle: specifies the periodic repetition of the on-duration followed by a possible period of inactivity;

(DRX) active time: total duration in which the UE monitors PDCCH. This includes the "on-duration" of the DRX cycle, the time during which the UE is performing continuous reception while the inactivity timer has not expired, and the time during which the UE is performing continuous reception while waiting for a retransmission opportunity.

When BA is configured, the UE may monitor PDCCH on one active BWP. The UE does not have to monitor PDCCH on the entire DL frequency of the cell. The UE may use a BWP inactivity timer (which may be independent of the DRX inactivity-timer described above) to switch the active BWP to the default one. In some implementations, the BWP inactivity timer may be restarted upon a successful PDCCH decoding and the UE may switch to the default BWP when the BWP inactivity timer expires.

In addition, the UE may be indicated, when configured accordingly, whether it is required to monitor the PDCCH during the next occurrence of the on-duration by a DCP monitored on the active BWP. When the UE does not detect a DCP on the active BWP, the UE may not monitor the PDCCH during the next occurrence of the on-duration, unless the UE is explicitly configured to do so. The UE may only be configured to monitor DCP when connected mode DRX is configured, and at occasion(s) that have a configured offset before the on-duration. More than one monitoring occasions may be configured before the on-duration. The UE may not monitor the DCP on occasions occurring during the active-time, measurement gaps, or BWP switching, in which case the UE may monitor the PDCCH during the next on-duration. If no DCP is configured in the active BWP, the UE may follow normal DRX operation. When CA is configured, a DCP may only be configured on the PCell. One DCP may be configured to control PDCCH monitoring during an on-duration for one or more UEs independently.

In some implementations, power saving for a UE in an RRC_IDLE mode and/or in an RRC_INACTIVE mode may be achieved by having a UE relax neighboring cells' radio resource management (RRM) measurements, for example, when the UE meets one or more criteria. The one or more criteria may include the UE being in low mobility and/or not being located at a cell edge. In some implementations, UE power saving may be enabled by adapting a DL maximum number of multiple input multiple output (MIMO) layers via BWP switching. In some implementations, power saving may be enabled during an active-time via cross-slot scheduling, which may facilitate the power saving under the assumption that the UE may not be scheduled to receive a PDSCH or may not be triggered to receive an aperiodic CSI (A-CSI) or transmit a PUSCH scheduled by a PDCCH until reaching the minimum scheduling offsets (e.g., offsets K0 and K2). In some implementations, dynamic adaptation of the minimum scheduling offsets K0 and K2 may be controlled by a PDCCH.

Dynamic Search Space (SS) Adaptation

Explicit SS Switching

In some implementations, dynamic SS adaptation may include SS set group (SSSG) switching in which a UE may be configured to switch between two different types of PDCCH monitoring (e.g., sparse/frequent PDCCH monitoring occasions). The search space set group may be replaced by "search space set" or "search space group" in the present disclosure. The search space set may also be replaced by "search space set group" or "search space group" in the present disclosure. In some implementations, the SSSG switching may be implemented through other mechanisms, such as an explicit indication, an implicit indication, an implicit condition, and/or by a timer.

Figure 2:
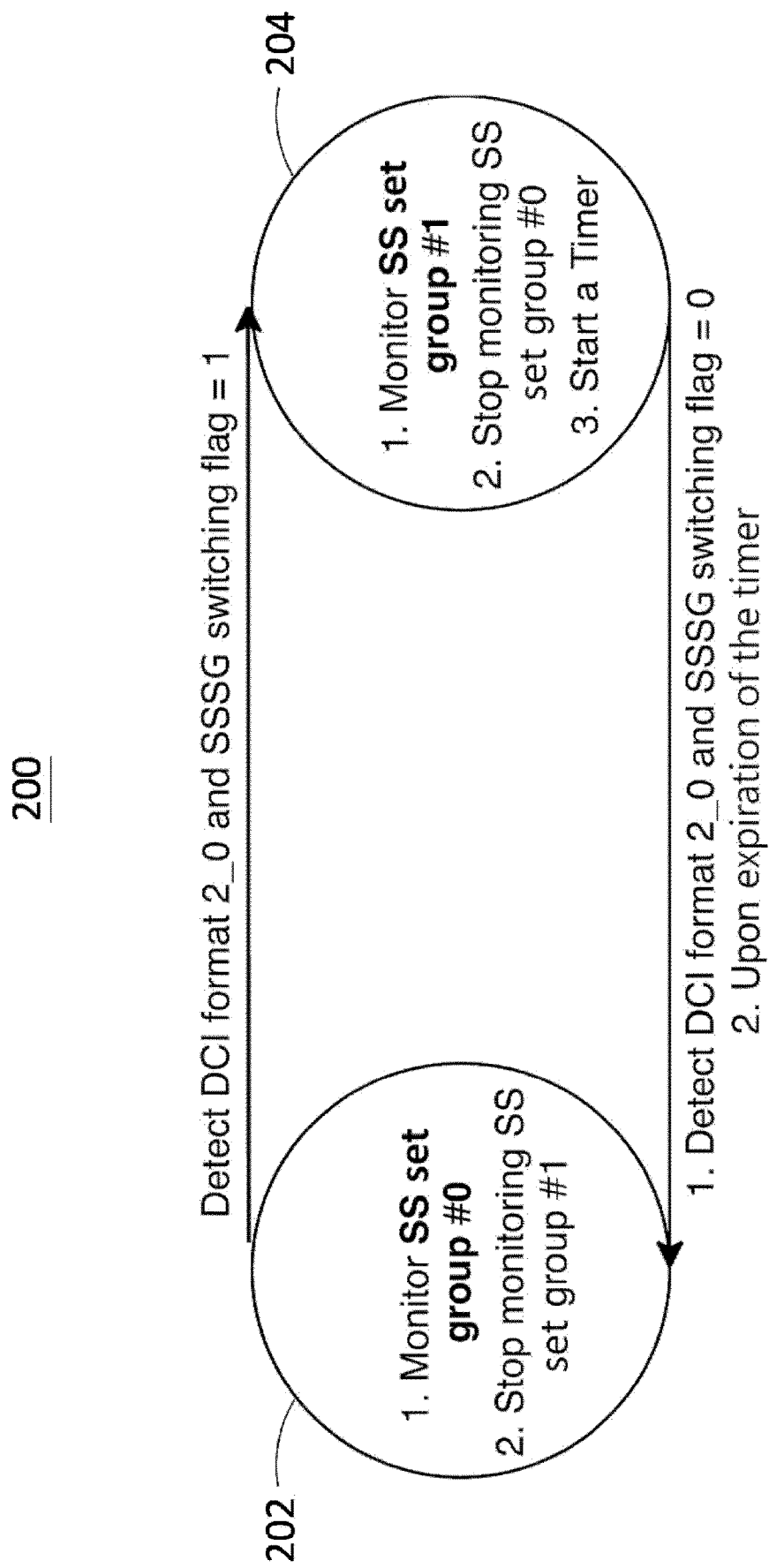
FIG. 2 is a state transition diagram illustrating an explicit SS switching mechanism for a UE according to an example implementation of the present disclosure.

FIG. 2 is a state transition diagram 200 illustrating an explicit SS switching mechanism for a UE according to an example implementation of the present disclosure. An explicit switching of two SS set groups may be achieved via detection of a specific DCI (e.g., DCI format 2_0). The UE may be configured with an RRC parameter, such as searchSpaceSwitchTrigger-r16. Each SearchSpaceSwitchingTrigger object provides position in DCI format 2_0 of the bit field indicating search space switching flag for a serving cell or, if CellGroupsForSwitching-r16 is configured, a group of serving cells. The bit value zero (0) of the search space switching flag may indicate a first SS set group (e.g., SS set group #0) to be monitored and the bit value one (1) of the search space switching flag may indicate the second SS set group (e.g., SS set group #1) to be monitored.

The RRC parameter searchSpaceSwitchTrigger-r16 may be included in an IE slot format indicator (e.g., SlotFormatIndicator). Table 1 illustrates a data structure of an example slot format indicator. In some implementations, the IE SlotFormatIndicator may be used to configure monitoring a group-common PDCCH for Slot-Format-Indicators (SFI).

TABLE 1

```
SlotFormatIndicator ::=    SEQUENCE {
    sfi-RNTI                    RNTI-Value,
    dci-PayloadSize             INTEGER (1..maxSFI-DCI-PayloadSize),
    [...]
    searchSpaceSwitchTriggerToAddModList-r16              SEQUENCE (SIZE(1..4)) OF
SearchSpaceSwitchTrigger-r16                        OPTIONAL, -- Need N
    searchSpaceSwitchTriggerToReleaseList-r16  SEQUENCE (SIZE(1..4)) OF  ServCellIndex
OPTIONAL, -- Need N
    [...]
SearchSpaceSwitchTrigger-r16 ::=  SEQUENCE {
    servingCellId-r16              ServCellIndex,
    positionInDCI-r16              INTEGER(0..maxSFI-DCI-PayloadSize-1)
}
```

As illustrated in FIG. 2, when the UE is in the state 202, the UE monitors SS set group #0 and stops monitoring SS set group #1. When a DCI (e.g., DCI format 2_0) is detected by the UE and the SSSG switching flag=1, the UE may switch from the state 202 to the state 204.

When the UE is in the state 204, the UE monitors SS set group #1 and stops monitoring SS set group #0. In some implementations, when a DCI (e.g., DCI format 2_0) is detected by the UE and the SSSG switching flag=0, the UE may switch from the state 204 to the state 202. In some implementations, the UE may start a timer in the state 204, and upon expiration of the timer, the UE may switch from the state 204 to the state 202.

Implicit SS Switching

Figure 3:
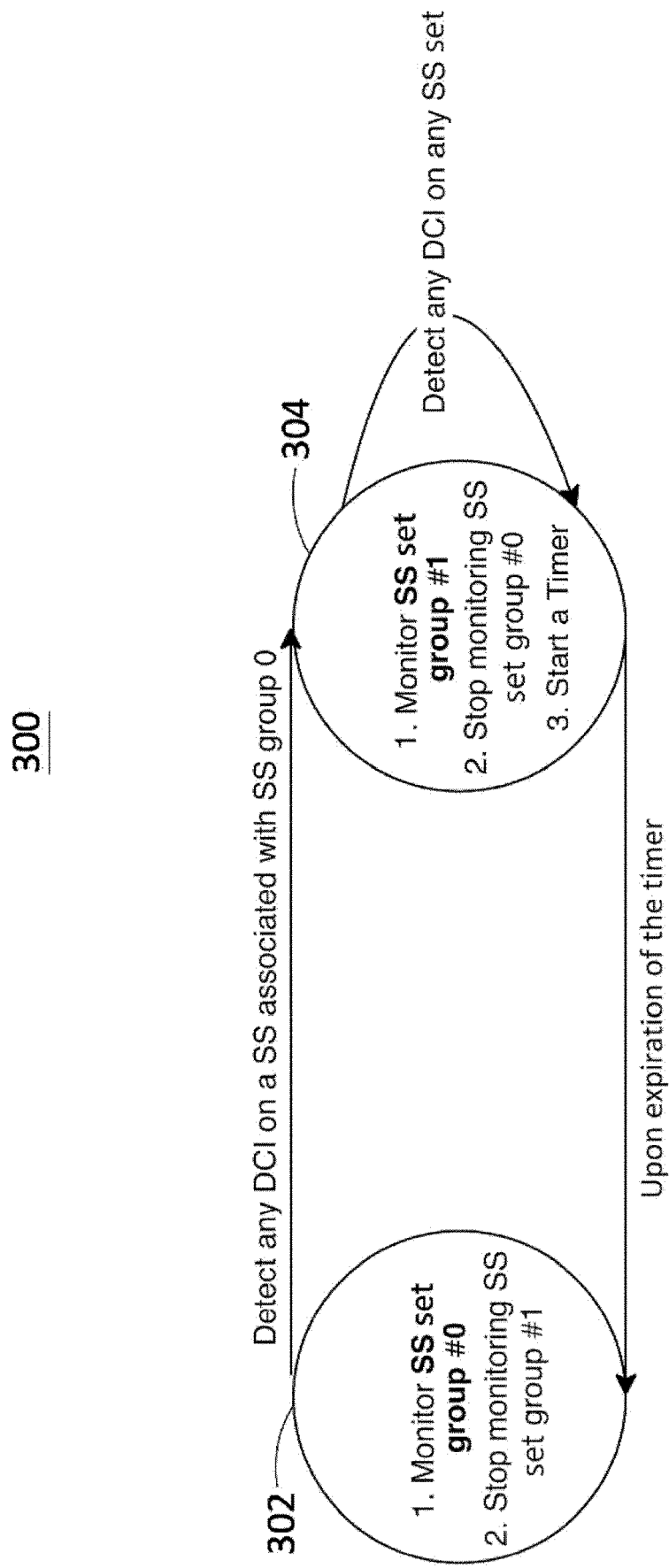
FIG. 3 is a state transition diagram illustrating an implicit SS switching mechanism for a UE according to an example implementation of the present disclosure.

FIG. 3 is a state transition diagram 300 illustrating an implicit SS switching mechanism for a UE according to an example implementation of the present disclosure. Implicit SS switching may be achieved when the UE is not configured with an RRC parameter, such as searchSpaceSwitchTrigger-r16. In some implementations, implicit switching may be achieved via a DCI (not limited to DCI format 2_0) and/or a timer.

As illustrated in FIG. 3, when the UE is in the state 302, the UE monitors SS set group #0 and stops monitoring SS set group #1. When any DCI on an SS associated with SS set group #0 is detected by the UE, the UE may switch from the state 302 to the state 304.

When the UE is in the state 304, the UE monitors SS set group #1 and stops monitoring SS set group #0. In some implementations, the UE may start a timer in the state 304, and upon expiration of the timer, the UE may switch from the state 304 to the state 302. In some implementations, the UE may not switch to the state 302 even after detecting any DCI on any SS while the timer is running. The UE may switch to the state 302 only after the timer expires.

Timer-Based SS Switching

In some implementations, a timer (e.g., searchSpaceSwitchingTimer) may be configured for SS switching. For example, the UE may (re-)start the timer when: the DCI format 2_0 is detected and the SSSG switching flag is set to 1, any DCI on an SS associated with SS set group #0 is detected, or any DCI on any SS is detected. Upon expiration of the timer, the UE may switch the SS to SS set group #0 (e.g., start monitoring SS set group #0 and stop monitoring SS set group #1). The timer-based SS switching may be applied to both explicit SS switching and implicit SS switching as illustrated in FIG. 2 and FIG. 3.

Search Space Configuration Parameters

In some implementations, SS configuration parameters, such as monitoringSlotPeriodicityAndOffset and/or duration in an SS Information Element (IE) (e.g., SearchSpace), may determine the specific slot(s) in the PDCCH that a UE may monitor. In some implementations, parameters, such as monitoringSymbolsWithinSlot in the SS IE (e.g., SearchSpace) and duration in ControlResourceSet IE, may determine at least a PDCCH monitoring occasion pattern within a slot.

Figure 4:
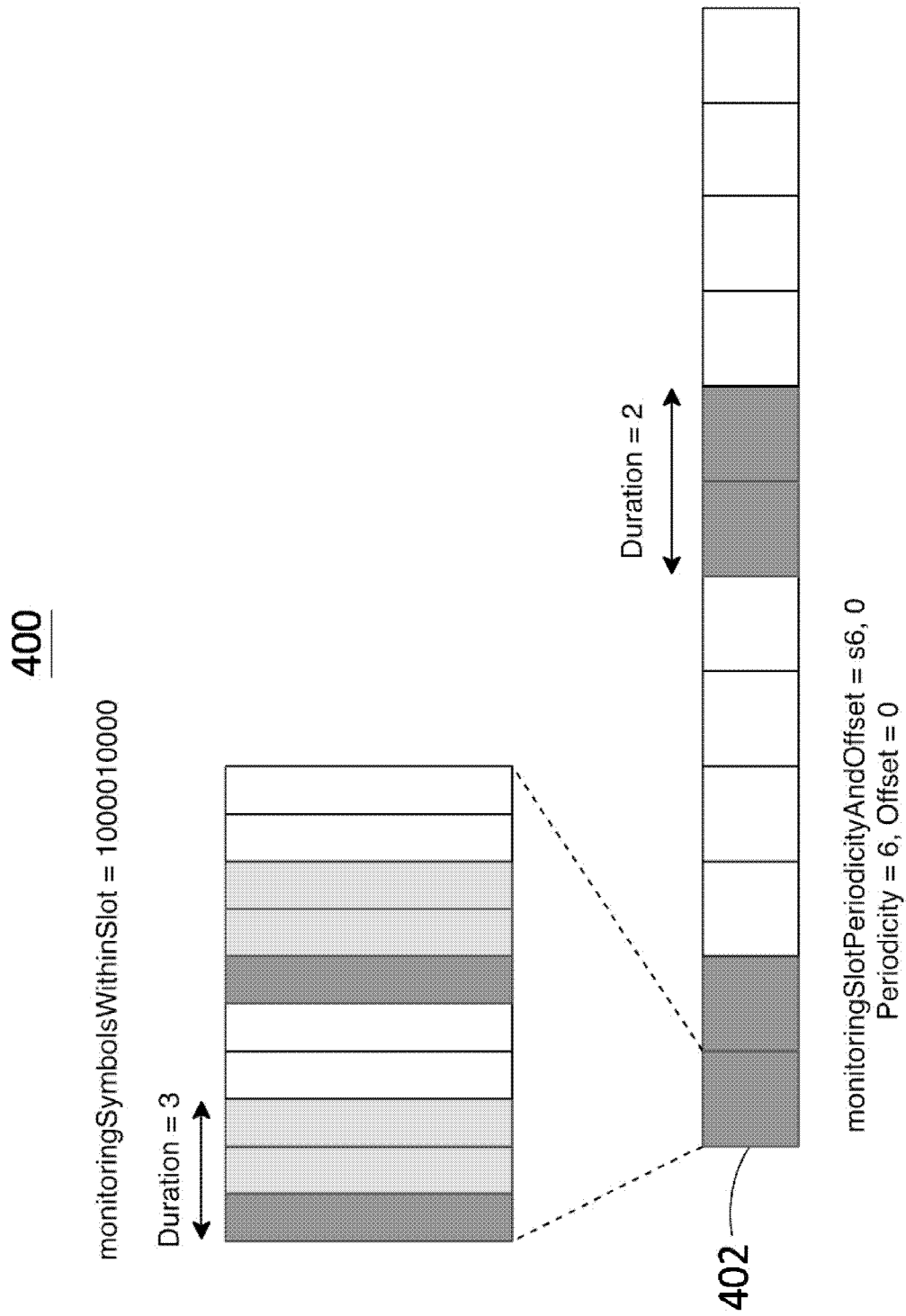
FIG. 4 is a schematic diagram illustrating identification of PDCCH monitoring occasions according to an example implementation of the present disclosure.

FIG. 4 is a schematic diagram 400 illustrating identification of PDCCH monitoring occasions according to an example implementation of the present disclosure. In some implementations, the parameter monitoringSymbolsWithinSlot may have a value of "1000010000" and a duration with a value of "3" in a slot 402. In some implementations, the parameter monitoringSlotPeriodicityAndOffset may have a value of (s6, 0), indicating a periodicity of "6" and an offset of "0" with a duration with a value of "2".

DCI with CRC Scrambled by PS-RNTI (DCP)

In some implementations, a physical layer signaling may be used to further control PDCCH monitoring behavior for a DRX on-duration based on a configured DRX mechanism. As such, the NW may send a physical layer signaling to a UE to determine whether or not the UE may wake up within a DRX on-duration (e.g., to start a drx-onDurationTrmer for the next DRX cycle or not to start the drx-onDurationTrmer for the next DRX cycle). The physical layer signaling may be called a DCP, or a DCI with CRC scrambled by PS-RNTI.

Figure 5:
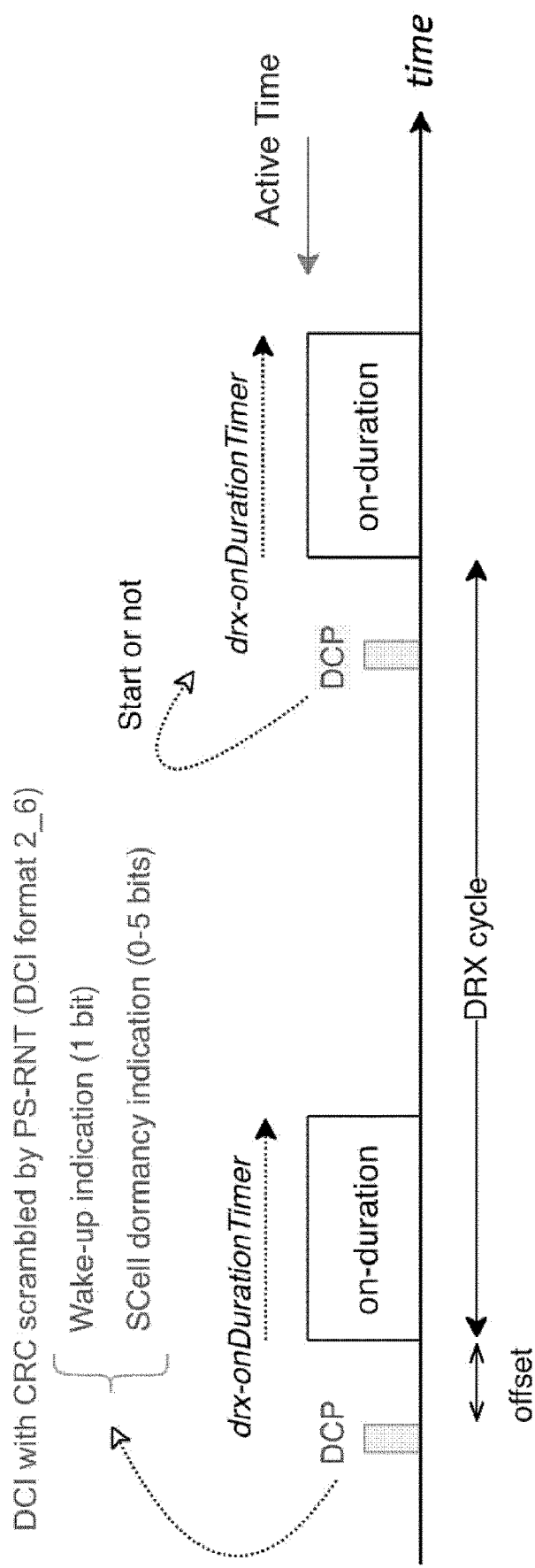
FIG. 5 is a schematic diagram illustrating a DCP mechanism according to an example implementation of the present disclosure.

FIG. 5 is a schematic diagram 500 illustrating a DCP mechanism according to an example implementation of the present disclosure. In some implementations, the DCP mechanism in FIG. 5 may be a DCP operation with a wake-up indication. In some implementations, a DCP may be indicated by a DCI format 2_6, which may be used for notifying power saving information outside a DRX Active Time for one or more UEs. In some implementations, the DCI format 2_6 may include a "wake-up indication" (e.g., represented by 1 bit) and a "dormancy indication" (e.g., SCell dormancy indication which may be represented by 0-5 bits). The "wake-up indication" may be used to control PDCCH monitoring behavior for an on-duration of a DRX via an on-duration timer (e.g., drx-onDurationTrmer) and the "dormancy indication" may be used to control a BWP switching (e.g., entering or leaving a dormant BWP) for the serving cell(s) corresponding to a dormancy group.

In some implementations, with regards to BWP switching for serving cell(s) of a dormancy group, the NW may group one or more serving cells (e.g., SCells) into a dormancy group and may configure one or more dormancy groups. A dormancy group configuration may be indicated by at least one of the dormancyGroupWithinActiveTime IE and dormancyGroupOutsideActiveTime IE (in ServingCellConfig). The IE dormancyGroupWithinActiveTime or dormancyGroupOutsideActiveTime may contain an identification (ID) of a dormancy group within or outside an active time to which the serving cell may belong. In some implementations, an IE maxNrofDormancyGroups may determine the quantity of groups configured for a Cell Group. In some implementations, when a dormancy group(s) is configured, the NW may switch the BWPs for all the serving cells in the dormancy group(s) entering or leaving a dormant BWP via a signaling (e.g., DCI format 2_6, DCI format 0_1, DCI format 1_1, etc.).

In some implementations, when a UE is provided with search space set(s) to monitor PDCCH for detection of a control information in an active DL BWP of a serving cell, the control information may indicate to the UE at least one of the following information:
search space set group (ID) indication/switching
search space set (ID) indication/switching
control resource set (ID) indication/switching
indicating/switching RRC parameter(s) configured in the RRC parameter SearchSpace
indicating/switching RRC parameter(s) configured in the RRC parameter ControlResourceSet How the UE interprets the information field(s) in the control information (e.g., DCI, or DCI format 0_1/1_1/2_6) and how to design the information field(s) in the control information should be determined.

Add One New Information Bit to the Control Information

In some implementations, the one new information bit may indicate (to the UE to switch) the search space set group (ID) according to the value of the one new information bit.

In some implementations, the one new information bit may indicate (to the UE to switch) the search space set group (ID) for SpCell according to the value of the one new information bit.

In some implementations, the one new information bit may indicate (to the UE to switch) the search space set group (ID) for all RRC configured cell groups (, or cell groups for switching, or cell groups for Dormancy) according to the value of the one new information bit.

In some implementations, the one new information bit may indicate (to the UE to switch) the search space set group (ID) for the cell that receives the control information according to the value of the one new information bit.

In some implementations, the one new information bit may indicate (to the UE to switch) the search space set group (ID) according to the value of the one new information bit for the cell according to the carrier indication field in the control formation.

In some implementations, the one new information bit may indicate (to the UE to switch) RRC parameter(s) configured in the RRC parameter SearchSpace (or ControlResourceSet) according to the value of the one new information bit.

In some implementations, the one new information bit may indicate (to the UE to switch) RRC parameter(s) configured in the RRC parameter SearchSpace (or ControlResourceSet) according to the value of the one new information bit for SpCell.

In some implementations, the one new information bit may indicate (to the UE to switch) RRC parameter(s) configured in the RRC parameter SearchSpace (or ControlResourceSet) for all RRC configured cell groups (or cell groups for switching, or cell groups for Dormancy) according to the value of the one new information bit.

In some implementations, the one new information bit may indicate (to the UE to switch) RRC parameter(s) configured in the RRC parameter SearchSpace (or ControlResourceSet) according to the value of the one new information bit for the serving cell that receives the control information.

In some implementations, the one new information bit may indicate (to the UE to switch) RRC parameter(s) configured in the RRC parameter SearchSpace (or ControlResourceSet) according to the value of the one new information bit for the cell according to the carrier indication field in the control formation.

Add One or More than One New Information Bit(s) to the Control Information Field.

In some implementations, each bit of the one or more than one new information bit(s) may indicate (to the UE to switch) the search space set group (ID) according to the value of the each bit of the one or more than one new information bit(s).

In some implementations, each bit of the one or more than one new information bit(s) may indicate (to the UE to switch) the search space set group (ID) according to the value of the each bit of the one or more than one new information bit(s) for all cells in an RRC configured cell group (or a cell group for switching, or a cell group for Dormancy).

In some implementations, each bit of the one or more than one new information bit(s) may indicate (to the UE to switch) RRC parameter(s) configured in RRC parameter SearchSpace (or ControlResourceSet) according to the value of the each bit of the one or more than one new information bit(s).

In some implementations, each bit of the one or more than one new information bit(s) may indicate (to the UE to switch) RRC parameter(s) configured in RRC parameter SearchSpace (or ControlResourceSet) for all cells in an RRC configured cell groups according to the value of the each bit of the one or more than one new information bit(s) (or cell groups for switching, or cell groups for Dormancy).

In some implementations, the one or more than one new information bits(s) may indicate (to the UE to switch) the search space set group (ID) according to the value of the one or more than one new information bit(s).

In some implementations, the one or more than one new information bits(s) may indicate (to the UE to switch) the search space set group (ID) according to the value of the one or more than one new information bit(s) for all RRC configured cell groups (or cell groups for switching, or cell groups for Dormancy).

In some implementations, the one or more than one new information bits(s) may indicate (to the UE to switch) the control resource set (ID) according to the value of the one or more than one new information bit(s).

In some implementations, the one or more than one new information bits(s) may indicate (to the UE to switch) the control resource set (ID) according to the value of the one or more than one new information bit(s) for all RRC configured cell groups (or cell groups for switching, or cell groups for Dormancy).

In some implementations, the one or more than one new information bits(s) may indicate (to the UE to switch) the search space set group (ID) according to the value of the one or more than one new information bit(s) for SpCell.

In some implementations, the one or more than one new information bits(s) may indicate (to the UE to switch) the control resource set group (ID) for SpCell.

In some implementations, the one or more than one new information bits(s) may indicate (to the UE to switch) RRC parameter(s) configured in RRC parameter SearchSpace (or ControlResourceSet) according to the value of the one or more than one new information bit(s) for the serving cell that receives the control information.

In some implementations, the one or more than one new information bits(s) may indicate (to the UE to switch) RRC parameter(s) configured in RRC parameter SearchSpace (or ControlResourceSet) according to the value of the one or more than one new information bit(s) for the cell according to the carrier indication field in the control formation.

Reuse existing information field in the control information if the information field in the control information is ignored by the UE (or reserved by the NW, or not used by the NW).

In some implementations, the existing information field may be Dormancy field(s) (or one or more than one of the existing information field(s) in the control information, or one or more than one of the existing information field(s) in the DCI format 0_0/0_1/0_2/1_0/1_1/1_2/2_0/2_1/2_2/2_3/2_4/2_5/2_6).

Jointly add one (or more than one) new information bit(s) and reuse existing information field(s) in the control information.

The new information bit(s) indicate/switch functions of the existing information field to the UE.

When the UE receives the control information and the value of the new information bit(s) is a specific value (such as 0/1/00/01/10/11, or a specific binary bitmap), the specific value may indicate/switch different functions of the existing information field (or the Dormancy field(s), or one or more than one of the existing information field(s) in the control information, or one or more than one of the existing information field(s) in the DCI format 0_0/0_1/0_2/1_0/1_1/1_2/2_0/2_1/2_2/2_3/2_4/2_5/2_6) to the UE. The function of the existing information field(s) may include at least one of Dormancy indication, search space set group (ID) switching/indication, search space (ID) switching/indication, control resource set (ID) switching/indication, control resource set switching/indication, RRC parameter(s) configured in RRC parameter SearchSpace switching/indication, and RRC parameter(s) configured in RRC parameter ControlResourceSet switching/indication.

In some implementations, when a UE receives/decodes/detects control information in PDCCH in an active DL BWP of a first serving cell, the UE may switch/change (may not switch/change in some implementations) PDCCH monitoring from one or more than one first search space set(s) (group) to one or more than one second search space set(s) (group) of one or more than one second serving cell(s) according to a specific value/setting/indication of one or more than one first information field(s) in the control information when the UE is configured with more than one search space set(s) (group). In some implementations, the UE may not change monitoring/detecting or switch search space set(s) (group) of serving cell(s) other than the one or more than one second serving cell(s). The first serving cell may belong to the one or more than one second serving cell(s).

In some implementations, when a UE receives/decodes/detects control information in PDCCH in an active DL BWP of a first serving cell, the UE may monitor/detect/change (may not monitor/detect/change in some implementations) one or more than one first search space set(s) (group) of one or more than one second serving cell(s) according to a specific value/setting/indication of one or more than one first information field(s) in the control information. The UE may not change monitoring/detecting or switch search space set(s) (group) of serving cell(s) other than the one or more than one second serving cell(s). The first serving cell may belong to the one or more than one second serving cell(s).

In some implementations, when a UE receives/decodes/detects control information in PDCCH in an active DL BWP of a first serving cell, the UE may start monitoring one or more than one first search space set(s)(group) and stop monitoring one or more than one second search space set(s)(group) in the active DL BWP of one or more than one second serving cell(s) at a symbol/slot/sub-slot/frame that is at least a time offset after the first/last symbol of the PDCCH with the control information. The time offset may include at least one of a processing time required for decoding and/or parsing the control information and a time duration for the control information to take effect. The UE may not change monitoring/detecting or switch search space set(s) of serving cell(s) other than the one or more than one second serving cell(s). The first serving cell may belong to the one or more than one second serving cell(s).

In some implementations, when a UE receives/decodes/detects control information in PDCCH in an active DL BWP of a first serving cell, the UE may start monitoring/detecting/changing one or more than one first search space set(s) (group) of one or more than one second serving cell(s) at a symbol/slot/sub-slot/frame that is at least a time offset after the first/last symbol of the PDCCH with the control information according to a specific value/setting/indication of one or more than one first information field(s) in the control information. The time offset may include at least one of a processing time required for decoding and/or parsing the control information and a time duration for the control information to take effect. The UE may not change monitoring/detecting or switch search space set(s) of serving cell(s) other than the one or more than one second serving cell(s). The first serving cell may belong to the one or more than one second serving cell(s).

In some implementations, when a UE receives/decodes/detects control information in PDCCH in an active DL BWP of a first serving cell, the UE may start changing/switching (may not change or switch in some implementations) one or more than one first BWP(s) of one or more than one second serving cell(s) at a symbol/slot/sub-slot/frame that is at least a time offset after the first/last symbol of the PDCCH with the control information according to a specific value/setting/indication of one or more than one first information field(s) in the control information. The time offset may include at least one of a processing time required for decoding and/or parsing the control information and a time duration for the control information to take effect. The UE may not change monitoring/detecting or switch search space set(s) of serving cell(s) other than the one or more than one second serving cell(s). The first serving cell may belong to the one or more than one second serving cell(s).

In some implementations, the NW may transmit the control information outside Active Time.

In some implementations, the NW may transmit the control information outside Active Time if a specific RRC parameter (e.g., ps-WakeUp-r16) is configured.

In some implementations, the NW may not transmit the control information outside Active Time if a specific RRC parameter (e.g., ps-WakeUp-r16) is not configured.

In some implementations, the UE may be expected to monitor/receive/decode/detect the control information outside Active Time.

In some implementations, the UE may be expected to monitor/receive/decode/detect the control information outside Active Time if a specific RRC parameter (e.g., ps-WakeUp-r16) is configured.

In some implementations, the UE may be expected not to monitor/receive/decode/detect the control information outside Active Time if a specific RRC parameter (e.g., ps-WakeUp-r16) is not configured.

In some implementations, the NW may not transmit the control information inside Active Time.

In some implementations, the UE may be expected not to monitor/receive/decode/detect the control information inside Active Time.

In some implementations, the control information may be DCI.

In some implementations, the control information may be a DL control signal/information/channel.

In some implementations, the control information may be a DCI format in USS.

In some implementations, the control information may be a DCI format in CSS.

In some implementations, the control information may be a DCI format 0_0.

In some implementations, the control information may be a DCI format 0_1.

In some implementations, the control information may be a DCI format 0_2.

In some implementations, the control information may be a DCI format 1_0.

In some implementations, the control information may be a DCI format 1_1.

In some implementations, the control information may be a DCI format 1_2.

In some implementations, the control information may be a DCI format 2_0.

In some implementations, the control information may be a DCI format 2_1.

In some implementations, the control information may be a DCI format 2_2.

In some implementations, the control information may be a DCI format 2_3.

In some implementations, the control information may be a DCI format 2_4.

In some implementations, the control information may be a DCI format 2_5.

In some implementations, the control information may be a DCI format 2_6.

In some implementations, the control information may be one of a DCI format 0_1, a DC format 1_1, a DC format 0_2, and a DC format 1_2.

In some implementations, the first serving cell may be the SpCell, or the PCell, or configured serving cell(s) (e.g., PCell, SCell(s), PSCell(s)).

In some implementations, the one or more than one first search space set(s) (group) may be a search spaces set(s) (group) that the UE is monitoring.

In some implementations, the one or more than one first search space set(s) (group) may be a search spaces set(s) (group) for detection of the control information.

In some implementations, the one or more than one first search space set(s) (group) may be all configured search spaces set(s) (group).

In some implementations, the one or more than one first search space set(s) (group) may be all configured search spaces set(s)(group) with (or identified by) a specific search space set group ID (e.g., group ID #0 or #1).

In some implementations, the one or more than one first search space set(s) (group) may be more/less dense/frequent in time than the one or more than one second search space set(s).

In some implementations, the one or more than one first search space set(s) (group) may have longer/shorter periodicity than the one or more than one second search space set(s).

In some implementations, the one or more than one first search space set(s) (group) may be the same as or different from the one or more than one second search space set(s).

In some implementations, the one or more than one second search space set(s) (group) may be search spaces set(s) that the UE is monitoring.

In some implementations, the one or more than one second search space set(s) (group) may be a search space set(s) (group) for detection of the control information.

In some implementations, the one or more than one second search space set(s) (group) may be all configured search spaces set(s).

In some implementations, the one or more than one second search space set(s) (group) may be all configured search spaces set(s) with (or identified by) a specific search space set group ID (e.g., group ID #0 or #1).

In some implementations, the one or more than one second search space set(s) (group) may be more/less dense/frequent in time than the one or more than one first search space set(s).

In some implementations, the one or more than one second search space set(s) (group) may have longer/shorter periodicity than the one or more than one first search space set(s).

In some implementations, the one or more than one second search space set(s) (group) may be the same as or different from the one or more than one first search space set(s).

In some implementations, the one of more than one second serving cell(s) may be SpCell.

In some implementations, the one of more than one second serving cell(s) may be PCell.

In some implementations, the one of more than one second serving cell(s) may be the first serving cell.

In some implementations, the one of more than one second serving cell(s) may be all serving cell(s) configured to the UE (e.g., PCell, SCell(s), PSCell(s)).

In some implementations, the one of more than one second serving cell(s) may be the serving cell that receives/decodes the control information.

In some implementations, the one of more than one second serving cell(s) may be all serving cell(s) within all configured cell group(s).

In some implementations, the one of more than one second serving cell(s) may be all serving cell(s) within a cell group.

In some implementations, the one of more than one second serving cell(s) may be the serving cell indicated by one or more than one second information field(s) in the control information.

In some implementations, the cell group may be a group of serving cell(s) configured in at least one RRC parameter(s), such as SearchSpaceSwitchConfig, CellGroupForSwitch, cellGroupsForSwitchList, DormancyGroupID, DormancyGroupID in dormancyGroupWithinActiveTime, and/or DormancyGroupID in dormancyGroupOutsideActiveTime.

In some implementations, the RRC parameter, such as SearchSpaceSwitchConfig and/or CellGroupForSwitch may be included in a PDCCH configuration. Table 2 illustrates a data structure of an example PDCCH configuration. The PDCCH configuration (e.g., PDCCH-Config) may include an IE SearchSpaceSwitchConfig-r16 and an IE CellGroupForSwitch-r16.

TABLE 2

```
PDCCH-Config ::=                    SEQUENCE {
    controlResourceSetToAddModList          SEQUENCE(SIZE (1..3)) OF ControlResourceSet
OPTIONAL,   -- Need N
    controlResourceSetToReleaseList         SEQUENCE(SIZE (1..3)) OF ControlResourceSetId
OPTIONAL,   -- Need N
    searchSpacesTo AddModList                SEQUENCE(SIZE (1..10)) OF SearchSpace
OPTIONAL,   -- Need N
    searchSpacesToReleaseList                SEQUENCE(SIZE (1..10)) OF SearchSpaceId
OPTIONAL,   -- Need N
    ...,
    [[
    controlResourceSetToAddModList2-r16  SEQUENCE (SIZE (1..2)) OF ControlResourceSet
OPTIONAL,   -- Need N
    controlResourceSetToReleaseList-r16  SEQUENCE (SIZE (1..5)) OF ControlResourceSetId-r16
OPTIONAL,   -- Need N
    searchSpacesToAddModListExt-r16          SEQUENCE(SIZE (1..10)) OF SearchSpaceExt-r16
OPTIONAL,   -- Need N
    uplinkCancellation-r16                          SetupRelease { UplinkCancellation-r16 }
OPTIONAL,   -- Need M
    monitoringCapabilityConfig-r16                                       ENUMERATED
{ r15monitoringcapability,r16monitoringcapability } OPTIONAL,  -- Need M
    searchSpaceSwitchConfig-r16         SearchSpaceSwitchConfig-r16
OPTIONAL   -- Need R
    ]]
}
SearchSpaceSwitchConfig-r16 ::=     SEQUENCE {
    cellGroupsForSwitchList-r16              SEQUENCE (SIZE (1..4)) OF CellGroupForSwitch-r16
OPTIONAL,   -- Need R
    searchSpaceSwitchDelay-r16                                    INTEGER (10..52)
OPTIONAL   -- Need R
}
CellGroupForSwitch-r16 ::=   SEQUENCE(SIZE (1..16)) OF ServCellIndex
```

In some implementations, the cell group may be a group of configured SCells from a number of groups of configured SCells for Dormancy indication.

In some implementations, the cell group may be a configured cell group for search space set (group) indication/switching.

In some implementations, the cell group may be a configured cell group for at least one of Dormancy indication/switching, search space set indication/switching, search space set group indication/switching, control resource set indication/switching, and RRC parameter, such as SearchSpace/ControlResourceSet, indication/switching.

In some implementations, the one or more than one second information field(s) may be carrier indication field in the control information.

In some implementations, the one or more than one second information field(s) may be the Dormancy indication field.

In some implementations, the one or more than one second information field(s) may be the Dormancy indication field that may indicate one or more than one function(s).

In some implementations, the one or more than one second information field(s) may be one or more than one existing information field(s) in the control information (e.g., according to TS 38.212 v.16.2.0).

In some implementations, the one or more than one second information field(s) may be one or more than one existing information field(s) in the control information (e.g., according to TS 38.212 v.16.2.0) that may indicate one or more than one function(s).

In some implementations, the one or more than one second information field(s) may be one or more than one information field(s) that does not exist in the control information (e.g., according to for example TS 38.212 v.16.2.0).

In some implementations, the one or more than one second information field(s) may be one or more than one information field(s) that does not exist in the control information (e.g., according to for example TS 38.212 v.16.2.0) that indicate one or more than one function(s).

In some implementations, the one or more than one function(s) may be Dormancy indication and search space set (group) indication/switching.

In some implementations, the one or more than one function(s) may be Dormancy indication and one of the information field in the control information.

In some implementations, the one or more than one function(s) may be any two of one or more than one first information field(s) in the control information.

In some implementations, the function may be determined by one or more than one first information field(s) in the control information.

In some implementations, the specific value/setting/indication may be a value of 0/1.

In some implementations, the specific value/setting/indication may be: the one or more than one first information field(s) in the control information is not empty (or not 0 bit).

In some implementations, the specific value/setting/indication may be: the one or more than one first information field(s) in the control information is not zero.

In some implementations, the specific value/setting/indication may be: the MSB/LSB of the one or more than one first information field(s) in the control information is a specific value, such as 0 or 1.

In some implementations, the specific value/setting/indication may be a specific bitmap, such as 00/01/10/11.

In some implementations, the specific value/setting/indication may be all other possible bitmaps with the number of bits according to the size of one or more than one first information field(s) in the control information.

In some implementations, the one or more than one first information field(s) in the control information may be one or more than one existing information field(s) in the control information (or DCI) (e.g., according to for example TS 38.212 v.16.2.0).

In some implementations, the one or more than one first information field(s) in the control information may be one or more than one existing information field(s) in the control information (or DCI) (e.g., according to for example TS 38.212 v.16.2.0) with one or more than one information bit(s) added to the existing information field(s).

In some implementations, the one or more than one first information field(s) in the control information may be one or more than one existing information field(s) in the control information (or DCI) (e.g., according to for example TS 38.212 v.16.2.0) that may indicate one or more than one function(s).

In some implementations, the one or more than one first information field(s) in the control information may be the Dormancy indication field.

In some implementations, the one or more than one first information field(s) in the control information may be one or more than one information field(s) that does not exist in the control information (or DCI) (e.g., according to for example TS 38.212 v.16.2.0).

In some implementations, the one or more than one first information field(s) in the control information may be one or more than one information field(s) that does not exist in the control information (or DCI) (e.g., according to for example TS 38.212 v.16.2.0) that may indicate one or more than one function(s).

The time offset may include at least one of a processing time which is required for decoding and/or parsing the control information and a time duration for the control information to take effect. The UE may not change monitoring/detecting or switch search space set(s) of serving cell(s) other than the one or more than one second serving cell(s). The time offset may be indicated/represented in different units.

In some implementations, the time offset may be represented in symbols (with smallest/largest SCS among the one or more than one second serving cell(s)).

In some implementations, the time offset may be represented in slots (with smallest/largest SCS among the one or more than one second serving cell(s)).

In some implementations, the time offset may be represented in sub-slots (with smallest/largest SCS among the one or more than one second serving cell(s)).

In some implementations, the time offset may be represented in a processing time in units of milliseconds.

In some implementations, the time offset may be for the UE to change/switch search space set(s).

In some implementations, the time offset may be for the UE to prepare search space set(s) switching/changing.

In some implementations, the time offset may be for the UE to change/switch search space set group(s), In some implementations, the time offset may be for the UE to prepare search space set group(s) switching/changing.

It should be noted that the search space set in the present disclosure may be replaced by the search space set ID, the search space set group, the search space set group ID, the control resource set, the control resource set ID, the control resource set group, the control resource set group ID, RRC parameter(s) configured in RRC parameter SearchSpace, or RRC parameter(s) configured in RRC parameter ControlResourceSet.

The RRC parameter(s) configured in RRC parameter SearchSpace may include searchSpaceId, controlResourceSetId, monitoringSlotPeriodicityAndOfset, duration, monitoringSymbolsWithinSlot, searchSpaceType, searchSpaceGroupIdList, and freqMonitorLocations.

The RRC parameter(s) configured in RRC parameter ControlResourceSet may include controlResourceSetId and duration.

In some implementations, when a UE detects DCI format 2_6 in PDCCH in an active DL BWP of a PCell, the UE may switch PDCCH monitoring from a search space set group ID #1 to search space set group ID #0 of all serving cell(s) within all configured SCell groups (for dormancy) according to the '0' value of a search space set group switching indication field in the DCI format 2_6. The search space set group switching indication field may be a new information field that is not in the existing information fields (e.g., according to TS 38.212 v.16.2.0). The value of search space set group switching indication field may indicate a search space set group ID that the UE should monitor. The switching may start at a slot that is at least 20 symbols with the smallest SCS among all configured serving cell(s) after the last symbol of the PDCCH with the DCI format 2_6 when the UE is configured with more than one search space set(s) groups.

In some implementations, when a UE detects DCI format 2_6 in PDCCH in an active DL BWP of a PCell, the UE may switch PDCCH monitoring (from a search space set group ID #1) to search space set group ID #0 of all serving cell(s) within the first and second configured SCell groups (for dormancy) and switch PDCCH monitoring (from a search space set group ID #0) to search space set group ID #1 of all serving cell(s) within the third configured SCell groups (for dormancy) according to the '001' value of a search space set switching indication field in the DCI format 2_6. The search space set switching indication field may be a new information field that is not in the existing information fields (e.g., according to TS 38.212 v.16.2.0). Each bit of the bitmap in the search space set switching field may indicate search space set group ID for the corresponding SCell groups (for search space set group switching). The switching may start at a slot that is at least 10 symbols with the smallest SCS among all configured serving cell(s) after the last symbol of the PDCCH with the DCI format 2_6 when the UE is configured with more than one search space set(s) group.

In some implementations, when a UE detects DCI format 2_6 in PDCCH in an active DL BWP of a PCell, the UE may switch PDCCH monitoring from a search space set group ID #1 to search space set group ID #0 of all serving cell(s) within the first and second configured SCell groups (for dormancy) according to '0' value of a new information field and '001' value of the Dormancy indication field in the DCI format 2_6. The new information field may not be in the existing information fields (e.g., according to TS 38.212 v.16.2.0) and may be used to indicate the function of the Dormancy indication field. Functions of the Dormancy indication field may include: value '0' (or '1') may indicate that Dormancy indication field is used for search space set group switching and value '1' (or '0') may indicate that Dormancy indication field is used for Dormancy indication. The Dormancy indication field may be an existing information field. When value '0' (or '1') is in the new information field, each bit of the bitmap in the Dormancy indication field may indicate search space set group ID for the corresponding SCell groups (for search space set switching). When value '1' (or '0') is in the new information field, each bit of the bitmap in the Dormancy indication field may indicate Dormancy for the corresponding SCell groups (for dormancy). The switching may start at a slot that is at least 20 symbols with the smallest SCS among all configured serving cell(s) after the last symbol of the PDCCH with the DCI format 2_6.

In some implementations, when a UE detects DCI format 2_6 in PDCCH in an active DL BWP of a PCell, the UE may switch PDCCH monitoring (from a search space set group ID #1) to search space set group ID #0 of all serving cell(s) within the first and second configured SCell groups (for dormancy, or for search space set group switching) and switch PDCCH monitoring (from a search space set group ID #0) to search space set group ID #1 of all serving cell(s) within the third configured SCell groups (for dormancy, or for search space set group switching) according to '0001' value of the Dormancy indication field in the DCI format 2_6. The Dormancy indication field may be an existing information field (e.g., according to TS 38.212 v.16.2.0) and the leftmost/rightmost) bit (or the MSB/LSB) may be used to indicate the function of the Dormancy indication field with value '0' indicating search space set group switching and value '1' indicating Dormancy indication. Each bit of the remaining bit(s) of the bitmap may indicate search space set group ID for the corresponding SCell groups (for search space set group switching or for Dormancy). The switching may start at a slot that is at least 20 symbols with the smallest SCS among all configured serving cell(s) after the last symbol of the PDCCH with the DCI format 26 (when the UE is configured with more than one search space set(s) group).

In some implementations, when a UE detects DCI format 2_6 in PDCCH in an active BWP of a PCell, the UE may change/switch BWP of all serving cell(s) within the first and second configured SCell groups (for search space set group switching, or for Dormancy) to a dormant BWP, and/or change/switch BWP of serving cell(s) within the third configured SCell groups to an active BWP (configured in RRC) if its current BWP is a dormant BWP (configured in RRC), and/or not change/switch BWP of serving cell(s) within the third configured SCell groups if its current BWP is not a dormant BWP (configured in RRC), according to '1001' value of the Dormancy indication field in DCI format 2_6. The Dormancy indication field may be an existing information field (e.g., according to TS 38.212 v.16.2.0) and the leftmost/rightmost bit (or MSB/LSB) may be used to indicate the function of the Dormancy indication field with value '0' indicating search space set group switching and value '1' indicating Dormancy indication. Each bit of the remaining bit(s) of the bitmap may indicate dormant BWP for the corresponding SCell groups (for search space set group switching, or for Dormancy). The switching may start at a slot that is at least 1 msec after the last symbol of the PDCCH with the DCI format 2_6.

In some implementations, when a UE detects DCI format 0_1 in PDCCH in an active DL BWP of a PCell, the UE may switch PDCCH monitoring from a search space set group ID #1 to search space set group ID #0 of serving cell ID #2 (and/or PCell) according to the '0' value of the Dormancy indication field and the '10' value of the carrier indicator field in the DCI format 0_1. The Dormancy indication field in DCI format 0_1 may indicate the search space set group (ID) for the serving cell (with serving cell ID indicated by the carrier indication field) and/or for the PCell. The carrier indicator field in DCI format 0_1 may not be expected to be 0. The Dormancy indication field in the DCI format 0_1 may be expected not to be empty (or not 0 bit). The switching may start at a slot that is at least 10 symbols with the SCS of serving cell ID #2 (or SCS of serving cell that detects the DCI format 0_1) after the last symbol of the PDCCH with the DCI format 0_1 when the UE is configured with more than one search space set(s) group. A search space set of a scheduled cell may be monitored when the search space set group containing the search space set of the scheduled cell is being monitored and/or the search space set group containing the search space set in the scheduling cell which is linked to the search space set of the scheduled cell is being monitored.

In some implementations, when a UE detects DCI format in PDCCH in an active DL BWP of a first serving cell, the UE may switch PDCCH monitoring from a search space set group ID #1 to search space set group ID #0 of serving cell ID #2 according to the '0' value of the SCell dormancy indication field and the '10' value of the carrier indicator field in the DCI format. The carrier indicator field in the DCI format may not be applied for cross-carrier scheduling. The Dormancy indication field in DCI format may indicate the search space set group (ID) for a second serving cell (with serving cell ID indicated by the carrier indication field) and for the first serving cell or the serving cells that may be cross-carrier scheduled by the carrier indication field or the serving cells in the same SCell group (for dormancy indication or SS set group switching) as the first serving cell or the serving cells in the same SCell group (for dormancy indication or SS set group switching) as the second serving cell. The switching may start at a slot that is at least 10 symbols with the SCS of serving cell ID #2 (or SCS of serving cell that detects DCI format) after the last symbol of the PDCCH with the DCI format when the UE is configured with more than one search space set(s) group. A search space set of a scheduled cell may be monitored when the search space set group containing the search space set of the scheduled cell is being monitored and/or the search space set group containing the search space set in the scheduling cell which is linked to the search space set of the scheduled cell is being monitored.

In some implementations, when a UE detects DCI format 0_1 in PDCCH in an active DL BWP of a PCell, the UE may start PDCCH monitoring from a search space set group ID #1 and stop monitoring search space set group ID #0 of serving cell ID #2 according to the '0' value of the Dormancy indication field and the '10' value of the carrier indicator field in the DCI format 0_1. The Dormancy indication field in DCI format 0_1 may indicate the search space set group (ID) for the serving cell (with serving cell ID indicated by the carrier indication field). The carrier indicator field in DCI format 0_1 may not be expected to be 0. The Dormancy indication field in the DCI format 0_1 may be expected not to be empty (or not 0 bit). The switching may start at a slot that is at least 10 symbols with the smallest SCS among all configured serving cell(s) after the last symbol of the PDCCH with DCI format 0_1 when the UE is configured with more than one search space set(s) group.

Implementations are disclosed regarding how the UE handles the situation when a UE is provided search space set(s) to monitor PDCCH for detection of control information (e.g., DCI or DCI format 2_6) in an active DL BWP of a serving cell (outside active time) and when the UE does not detect the control information (or the DCI).

Implementations are disclosed regarding the UE's procedure when the UE does not monitor PDCCH for detecting a control information (or the DCI) during Active Time.

In some implementations, the control information (such as DCI, DCI format 0_0/0_1/0_2/1_0/1_1/1_2/2_0/2_1/2_2/2_3/2_4/2_5/2_6, or other DCI formats configured in the search space set) may indicate to the UE one or more than one of the following information:
  search space set group (ID) indication/switching
  search space set (ID) indication/switching
  control resource set (ID) indication/switching indicating/switching RRC parameter(s) configured in RRC parameter SearchSpace indicating/switching RRC parameter(s) configured in RRC parameter ControlResourceSet In some implementations, a new RRC parameter (e.g., ps-SearchSpaceGroupSwitch) may be added. When a value of the new RRC parameter is a first value (e.g., 'true'), the UE may monitor all configured search space set(s) in some implementations, the UE may not monitor all configured search space set in some other implementations, the UE may monitor a configured default search space set in some other implementations, the UE may monitor a search space with a configured default search space set group ID in some other implementations, and the UE may not change/switch currently monitored search space set(s) (group) in some other implementations.

When a value of the new RRC parameter is a second value (e.g., 'false') (or the new RRC parameter is not configured/empty/0 bit), the UE may not change/switch currently monitored search space set(s) (group) in some implementations, the UE may not monitor all configured search space set in some other implementations, the UE may monitor a configured default search space set in some other implementations, the UE may monitor a search space with a configured default search space set group ID in some other implementations, and the UE may monitor all configured search space set(s)) in some other implementations.

In some implementations, when a UE is provided search space set(s) to monitor PDCCH for detection of control information (e.g., DCI or DCI format 2_6) in an active DL BWP of a serving cell (outside active time) and the UE does not detect the control information (or the DCI), the UE may start monitoring (or detecting) PDCCH (or PDCCH candidates, Control information, DCI) according to a search space set in an active DL/UL BWP, on the serving cell at a symbol/slot/sub-slot/frame that is at least a time offset after the start of the drx-onDurationTimer.

In some implementations, the search space set may be a default search space set configured in RRC in the active DL/UL BWP.

In some implementations, the search space set may have a default search space set group ID configured in RRC in the active DL/UL BWP.

In some implementations, the search space set may be configured in RRC with smallest/largest searchSpaceId in the active DL/UL BWP.

In some implementations, the search space set may have specific search space set group ID (e.g., 0, or 1, or both 0 and 1, or other search space group ID configured in SearchSpace).

In some implementations, the search space set may be all search space set configured in an active BWP.

In some implementations, the time offset may include at least one of a processing time required for decoding and/or parsing the control information and a time duration for the control information to take effect.

In some implementations, when a UE is provided search space set(s) to monitor PDCCH for detection of control information (e.g., DCI or DCI format 2_6) in an active DL BWP of a serving cell (outside active time) and the UE does not detect the control information (or the DCI), the UE may not change/switch a search space set group.

In some implementations, when a UE is provided search space set(s) to monitor PDCCH for detection of control information (e.g., DCI or DCI format 2_6) in an active DL BWP of a serving cell (outside active time) and the UE does not detect the control information (or the DCI), the UE may not change/switch a search space set.

In some implementations, when a UE is provided search space set(s) to monitor/receive/decode PDCCH for (detecting) control information in an active DL BWP of a first serving cell outside Active Time, the UE may perform a first specific action in the active DL BWP of one or more than one second serving cell(s) during Active Time when a specific first condition is satisfied.

The specific first condition may include at least one of:
A first RRC parameter is configured.
The first RRC parameter indicates search space set (group) switching/indication/changing.
The first RRC parameter is a new RRC parameter (in DCP-Config).
The first RRC parameter is ps-WakeUp.
The value of the first RRC parameter (or a value of ps-WakeUp) is a specific value, such as 'true', 'false', '1', or '0'.
A value/field of the first RRC parameter (or a value/field of ps-WakeUp) is not configured.
A value/field of the first RRC parameter (or a value/field of ps-WakeUp) is empty (or not configured).
The UE does not detect the control information.

The specific first action performed by the UE may include at least one of:
start monitoring one or more than one first search space set(s) (group)
stop monitoring one or more than one second search space set(s) (group)
change one or more than one second search space set(s) (group)
not change/switch currently monitored search space set(s) (group)
not monitor all configured search space set(s) (group)
not monitor any configured search space set(s) (group)
start monitoring a configured default search space set (group)
start monitoring a search space with a configured default search space set group ID
start monitoring all configured search space set(s)) (group).

The starting point of search space set change/switch may be at least a time offset after the start of the drx-onDurationTimer (or the start of each/every DRX cycle).

In some implementations, a UE may not monitor PDCCH for detecting control information during/in Active Time. The UE may perform a specific second action in the active DL BWP of one or more than one second serving cell(s) during Active Time when at least one of the specific second conditions is satisfied.

The specific second conditions may include at least one of:
A first RRC parameter is configured.
The first RRC parameter indicates search space set (group) switching/indication/changing.
The first RRC parameter is a new RRC parameter (in DCP-Config).
The first RRC parameter ps-WakeUp is configured.
The value of the first RRC parameter (or a value of ps-WakeUp) is a specific value, such as 'true', 'false', '1', or '0'.
A value of the first RRC parameter (or a value of ps-WakeUp) is not configured.
A value/field of the first RRC parameter (or a value/field of ps-WakeUp) is empty (or not configured).
The UE does not detect the control information.

The specific second action performed by the UE may include at least one of:
- start monitoring one or more than one first search space set(s) (group)
- stop monitoring one or more than one second search space set(s) (group)
- not change one or more than one second search space set(s) (group)
- not change/switch currently monitored search space set(s) (group)
- not monitor all configured search space set(s) (group)
- not monitor any configured search space set(s) (group)
- start monitoring a configured default search space set (group)
- start monitoring a search space with a configured default search space set group ID
- start monitoring all configured search space set(s)) (group).

The starting point of search space set change/switch may be at least a time offset after the start of each/every DRX cycle (or the start of the drx-onDurationTimer).

In some implementations, when a UE is provided search space set(s) to monitor PDCCH for (detecting) control information in an active DL BWP of a first serving cell outside Active Time and the UE does not detect the control information outside Active Time, the UE may start monitoring one or more than one first search space set(s) and stop monitoring one or more than one second search space set(s) in an active DL BWP of one or more than one second serving cell(s) (during Active Time). The UE may start monitoring the one or more than one first search space set(s) and stop monitoring the one or more than one second search space set(s) in the active DL BWP of the one or more than one second serving cell(s) at a symbol/slot/sub-slot/frame that is at least a time offset after the start of the drx-onDurationTimer (or the start of each/every DRX cycle).

In some implementations, when a UE is provided search space set(s) to monitor PDCCH for (detecting) control information in an active DL BWP of a first serving cell outside Active Time and/or the UE does not detect the control information and/or a first RRC parameter (for search space set(s) switching/changing/indicating) is configured, the UE may start monitoring one or more than one first search space set(s) and stop monitoring one or more than one second search space set(s) in an active DL BWP of one or more than one second serving cell(s) (during Active Time) according to a value in the first RRC parameter. The UE may start monitoring the one or more than one first search space set(s) and stop monitoring the one or more than one second search space set(s) in the active DL BWP of the one or more than one second serving cell(s) at a symbol/slot/sub-slot/frame that is at least a time offset after the start of the drx-onDurationTimer (or the start of each/every DRX cycle).

In some implementations, a UE may not monitor PDCCH(s) for (detecting) control information (for search space set(s) (group) indication, and/or for Dormancy indication, and/or for wake up indication) during Active Time. The UE may start monitoring one or more than one second search space set(s) during Active Time in an active DL BWP of one or more than one second serving cell(s). The UE may start monitoring the one or more than one second search space set(s) at a symbol/slot/sub-slot/frame that is at least a time offset after the start of each/every DRX cycle (or the start of the drx-onDurationTimer).

In some implementations, a UE may not monitor PDCCH(s) for (detecting) control information (for search space set(s) (group) indication, and/or for Dormancy indication, and/or for wake up indication) during Active Time. A first RRC parameter (for search space set(s) (group) switching/changing/indicating) may be configured. The UE may start monitoring one or more than one second search space set(s) during Active Time in the active DL BWP of one or more than one second serving cell(s) according to the value in the first RRC parameter. The UE may start monitoring the one or more than one second search space set(s) at a symbol/slot/sub-slot/frame that is at least a time offset after the start of each/every DRX cycle (or the start of the drx-onDurationTimer).

In some implementations, when a UE is provided search space set(s) to monitor PDCCH for (detecting) control information in an active DL BWP of a first serving cell outside Active Time and/or the UE does not detect the control information, the UE may not change one or more than one second search space set(s) to monitor/receive/decode PDCCH in the active DL BWP of one or more than one second serving cell(s) during Active Time (or the UE may not change currently monitored search space set(s) in the active DL BWP of current serving cell(s) during Active Time).

In some implementations, when a UE is provided search space set(s) to monitor PDCCH for (detecting) control information in an active DL BWP of a first serving cell outside Active Time, and/or the UE does not detect the control information, and/or a first RRC parameter (for search space set(s) (group) switching/changing/indicating) is configured, the UE may not change one or more than one second search space set(s) to monitor/receive/decode PDCCH in an active DL BWP of one or more than one second serving cell(s) during Active Time (, or the UE may not change current monitored search space set(s) in the active DL BWP of current serving cell(s) during Active Time) according to the value in the first RRC parameter.

In some implementations, a UE may not monitor PDCCH for (detecting) control information (for search space set(s) (group) indication, Dormancy indication, wake up indication) during Active Time, RAR window, measurement gaps, and/or BWP switching. The UE may not change one or more than one second search space set(s) to monitor/receive/decode PDCCH in an active DL BWP of one or more than one second serving cell(s) during Active Time (or the UE may not change currently monitored search space set(s) in the active DL BWP of current serving cell(s) during Active Time).

In some implementations, a UE may not monitor/receive/decode PDCCH(s) for (detecting) control information (for search space set(s) (group) indication, Dormancy indication, wake up indication) during Active Time. A first RRC parameter (for search space set(s) (group) switching/changing/indicating) may be configured. The UE may not change one or more than one second search space set(s) to monitor/receive/decode PDCCH in an active DL BWP of one or more than one second serving cell(s) during Active Time (or the UE may not change currently monitored search space set(s) in the active DL BWP of current serving cell(s) during Active Time) according to the value in the first RRC parameter.

In some implementations, the NW may transmit the control information outside Active Time.

In some implementations, the NW may transmit the control information outside Active Time if a specific RRC parameter (e.g., ps-WakeUp-r16) is configured.

In some implementations, the NW may not transmit the control information outside Active Time if a specific RRC parameter (e.g., ps-WakeUp-r16) is not configured.

In some implementations, the UE may be expected to monitor/receive/decode/detect the control information outside Active Time.

In some implementations, the UE may be expected to monitor/receive/decode/detect the control information outside Active Time if a specific RRC parameter (e.g., ps-WakeUp-r16) is configured.

In some implementations, the UE may be expected not to monitor/receive/decode/detect the control information outside Active Time if a specific RRC parameter (e.g., ps-WakeUp-r16) is not configured.

In some implementations, the NW may not transmit the control information inside Active Time.

In some implementations, the UE may be expected not to monitor/receive/decode/detect the control information inside Active Time.

In some implementations, the control information may be DCI.

In some implementations, the control information may be a DL control signal/information/channel.

In some implementations, the control information may be a DCI format in USS.

In some implementations, the control information may be a DCI format in CSS.

In some implementations, the control information may be a DCI format 0_0.

In some implementations, the control information may be a DCI format 0_1.

In some implementations, the control information may be a DCI format 0_2.

In some implementations, the control information may be a DCI format 1_0.

In some implementations, the control information may be a DCI format 1_1.

In some implementations, the control information may be a DCI format 1_2.

In some implementations, the control information may be a DCI format 2_0.

In some implementations, the control information may be a DCI format 2_1.

In some implementations, the control information may be a DCI format 2_2.

In some implementations, the control information may be a DCI format 2_3.

In some implementations, the control information may be a DCI format 2_4.

In some implementations, the control information may be a DCI format 2_5.

In some implementations, the control information may be a DCI format 2_6.

In some implementations, the control information may be one of a DCI format 0_1, a DC format 1_1, a DC format 0_2, and a DC format 1_2.

In some implementations, the first serving cell may be the SpCell, or the PCell, or configured serving cell(s) (e.g., PCell, SCell(s), PSCell(s)).

In some implementations, the one or more than one first search space set(s) (group) may be a search space set with (or identified by) a specific search space set group ID (e.g., 0, 1, both 0 and 1, or other configured search space set group ID).

In some implementations, the one or more than one first search space set(s) (group) may be search space set(s) provided to the UE.

In some implementations, the one or more than one first search space set(s) (group) may be search space set(s) that the UE is currently monitoring.

In some implementations, the one or more than one first search space set(s) (group) may be the same as the one or more than one second search space set(s).

In some implementations, the one or more than one first search space set(s) (group) may be all search space set(s) configured in higher layer(s) (e.g., MAC layer, RRC layer).

In some implementations, the one or more than one second search space set(s) (group) may be a default search space set(s) configured in higher layer(s).

In some implementations, the one or more than one second search space set(s) (group) may be a default search space set(s) with a smallest/largest search space set ID.

In some implementations, the one or more than one second search space set(s) (group) may be a search space set with a specific search space set group ID (e.g., 0, 1, both 0 and 1, or other configured search space set group ID).

In some implementations, the one or more than one second search space set(s) (group) may be search space set(s) provided to the UE.

In some implementations, the one or more than one second search space set(s) (group) may be search space set(s) that the UE is monitoring.

In some implementations, the one or more than one second search space set(s) (group) may be the same as the one or more than one first search space set(s).

In some implementations, the one or more than one second search space set(s) (group) may be all search space set(s) configured in higher layer(s).

The time offset may include at least one of a processing time required for decoding and/or parsing the control information and a time duration for the control information to take effect. The UE may not change monitoring/detecting or switch search space set(s) of serving cell(s) other than the one or more than one second serving cell(s). The time offset may be indicated/represented in different units.

In some implementations, the time offset may be represented in symbols (with smallest/largest SCS among the one or more than one second serving cell(s)).

In some implementations, the time offset may be represented in slots (with smallest/largest SCS among the one or more than one second serving cell(s)).

In some implementations, the time offset may be represented in sub-slots (with smallest/largest SCS among the one or more than one second serving cell(s)).

In some implementations, the time offset may be represented in a processing time in units of milliseconds.

In some implementations, the time offset may be for the UE to change/switch search space set(s).

In some implementations, the time offset may be for the UE to prepare search space set(s) switching/changing.

In some implementations, the time offset may be for the UE to change/switch search space set group(s), In some implementations, the time offset may be for the UE to prepare search space set group(s) switching/changing.

In some implementations, the one or more than one second serving cell(s) may be at least one of a SpCell, a PCell, the first serving cell, all serving cell(s) configured to the UE (e.g., PSCell, PCell, SCell), the serving cell that the UE does not monitor/receive/decode the control information, all serving cell(s) within all configured cell group(s), and all serving cell(s) within a cell group.

In some implementations, the cell group may be a group of serving cell(s) configured in at least one RRC parameter(s), such as SearchSpaceSwitchConfig, Cell- GroupForSwitch, cellGroupsForSwitchList, DormancyGroupID, DormancyGroupID in dormancyGroupWithinActiveTime, and DormancyGroupID in dormancyGroupOutsideActiveTime.

In some implementations, the cell group may be a group of configured SCells from the number of groups of configured SCells for Dormancy indication.

In some implementations, the cell group may be a configured cell group for search space set (group) indication/switching.

In some implementations, the cell group may be a configured cell group for at least one of Dormancy indication/switching, search space set indication/switching, search space set group indication/switching, control resource set indication/switching, and RRC parameter SearchSpace/ControlResourceSet indication/switching.

In some implementations, the first RRC parameter may indicate search space set (group) switching/indication/changing.

In some implementations, the first RRC parameter may be a new RRC parameter (in DCP-Config) that is not present in the existing control information (e.g., according to TS 38.331 v.16.1.0).

In some implementations, the first RRC parameter may be ps-WakeUp-r16.

In some implementations, the value of the first RRC parameter (or a value of ps-WakeUp-r16) may be 'true'. The value may be 'false', '1', or '0' in some implementations.

In some implementations, when a UE is provided with a search space set (group) to monitor PDCCH for detection of DCI format 2_6 in an active DL BWP of a PCell outside Active Time and the UE does not detect the DCI format 2_6, the UE may start monitoring all search space set(s) configured in higher layer(s) in the active BWP of all configured serving cell(s) during Active Time. Since the NW may (always) transmit DCI format 2_6 outside Active Time if ps-WakeUp-r16 is configured, the UE may determine a miss detection of DCI format 2_6 rather than a fact that the NW does not transmit DCI format 2_6. The UE may start monitoring all search space set(s) at a slot that is at least 20 (the number is merely exemplary rather than limiting) symbols with the smallest SCS among all configured serving cell(s) after the start of the drx-onDurationTimer.

In some implementations, when a UE is provided with a search space set (group) to monitor PDCCH for detection of DCI format 2_6 in an active DL BWP of a PCell outside Active Time and the UE does not detect the DCI format 2_6, and/or the value of RRC parameter ps-SearchSpaceGroupSwitch is 'true', and/or ps-WakeUp-r16 is configured, the UE may start monitoring all search space set(s) (group) configured in higher layer(s) in the active BWP of all configured serving cell(s) during Active Time.

The ps-SearchSpaceGroupSwitch may be a new RRC parameter (in DCP-Config) that is not present in existing control information (e.g., according to TS 38.331 v.16.1.0).

The parameter ps-SearchSpaceGroupSwitch may indicate to the UE which search space set(s) (group) to monitor when the DCI format 2_6 is not detected.

The value of the parameter ps-SearchSpaceGroupSwitch being 'true' may indicate to the UE to monitor all search space set(s) (group) configured in higher layer(s). The value 'false' (or ps-SearchSpaceGroupSwitch is not configured, or the field of ps-SearchSpaceGroupSwitch is empty) may indicate to the UE not to change currently monitored search space set(s) (group).

Since the NW may (always) transmit DCI format 2_6 outside Active Time if ps-WakeUp-r16 is configured, the UE may determine a miss detection of DCI format 2_6 rather than the fact that NW does not transmit DCI format 2_6. The UE may start monitoring all search space set(s) at a slot that is at least 20 (the number is merely exemplary rather than limiting) symbols with the SCS of PCell after the start of the drx-onDurationTimer.

In some implementations, when a UE is provided with a search space set (group) to monitor PDCCH for detection of DCI format 2_6 in an active DL BWP of a PCell outside Active Time and the UE does not detect the DCI format 2_6, the UE may start PDCCH monitoring a search space set (group) ID #0 and stop monitoring search space set (group) ID #1. Search space set (group) ID #0 may be configured as a default search space set group ID during Active Time. Since the NW may (always) transmit DCI format 2_6 outside Active Time, the UE may determine a miss detection of DCI format 2_6 rather than the fact that NW does not transmit DCI format 2_6, if ps-WakeUp-r16 is configured. The UE may start monitoring search space set group ID #0 and stop monitoring search space set group ID #1 at a slot that is at least 20 (the number is merely exemplary rather than limiting) symbols with the smallest SCS among all configured serving cell(s) after the start of the drx-onDurationTimer.

In some implementations, when a UE is provided with a search space set (group) to monitor PDCCH for detection of DCI format 2_6 in an active DL BWP of a PCell outside Active Time and the UE does not detect the DCI format 2_6, the UE may not change currently monitored search space set(s) (group) (during Active Time).

In some implementations, when a UE does not monitor/receive/decode PDCCH for detecting control information during Active Time, the UE may start monitoring search space set group ID #0 (which corresponds to a default search space set group) and stop monitoring search space set group ID #1 in the active BWP of all configured serving cell(s) at a slot that is at least 20 symbols with the smallest SCS among all configured serving cell(s) after the start of each/every DRX cycle.

In some implementations, when a UE does not monitor/receive/decode PDCCH for detecting control information during Active Time, and/or the value of RRC parameter ps-SearchSpaceGroupSwitch is 'true', the UE may start monitoring all search space set(s) (group) configured in higher layer(s) in the active BWP of all configured serving cell(s) during Active Time. The ps-SearchSpaceGroupSwitch is a new RRC parameter (in DCP-Config) that may not exist in the control information according to for example TS 38.331 v.16.1.0. The parameter ps-SearchSpaceGroupSwitch may indicate the UE which search space set(s)(group) to monitor When DCI format 2_6 is not detected. Value 'true' may indicate to the UE to monitor all search space set(s) (group) configured in higher layer(s). Value 'false' (or ps-SearchSpaceGroupSwitch is not configured, or the field of ps-SearchSpaceGroupSwitch is empty) may indicate to the UE not to change currently monitored search space set(s) (group).

In some implementations, when a UE does not monitor/receive/decode PDCCH for detecting control information during Active Time, and/or the value of RRC parameter ps-SearchSpaceGroupSwitch is not configured, the UE may not change currently monitored search space set(s) (group) configured in higher layer(s) in the active BWP of all configured serving cell(s) during Active Time. The ps-SearchSpaceGroupSwitch may be a new RRC parameter (in DCP-Config) that is not present in existing control information (e.g., according to TS 38.331 v.16.1.0). The parameter ps-SearchSpaceGroupSwitch may indicate to the UE which search space set(s) (group) to monitor when DCI format 2_6 is not detected. Value 'true' may indicate to the UE to monitor all search space set(s) (group) configured in higher layer(s). Value 'false' (or ps-SearchSpaceGroupSwitch is not configured, or the field of ps-SearchSpaceGroupSwitch is empty) may indicate to the UE not to change currently monitored search space set(s) (group).

In some implementations, when a UE is provided a search space set to monitor PDCCH for detection of DCI format 2_6 in an active DL BWP of a PCell inside Active Time and the UE does not monitor/receive/decode PDCCH for detecting DCI format 2_6 during Active Time, the UE may not change currently monitored search space set(s) (group) configured in higher layer(s) in the active DL BWP of all configured serving cell(s) during Active Time.

Figure 6:
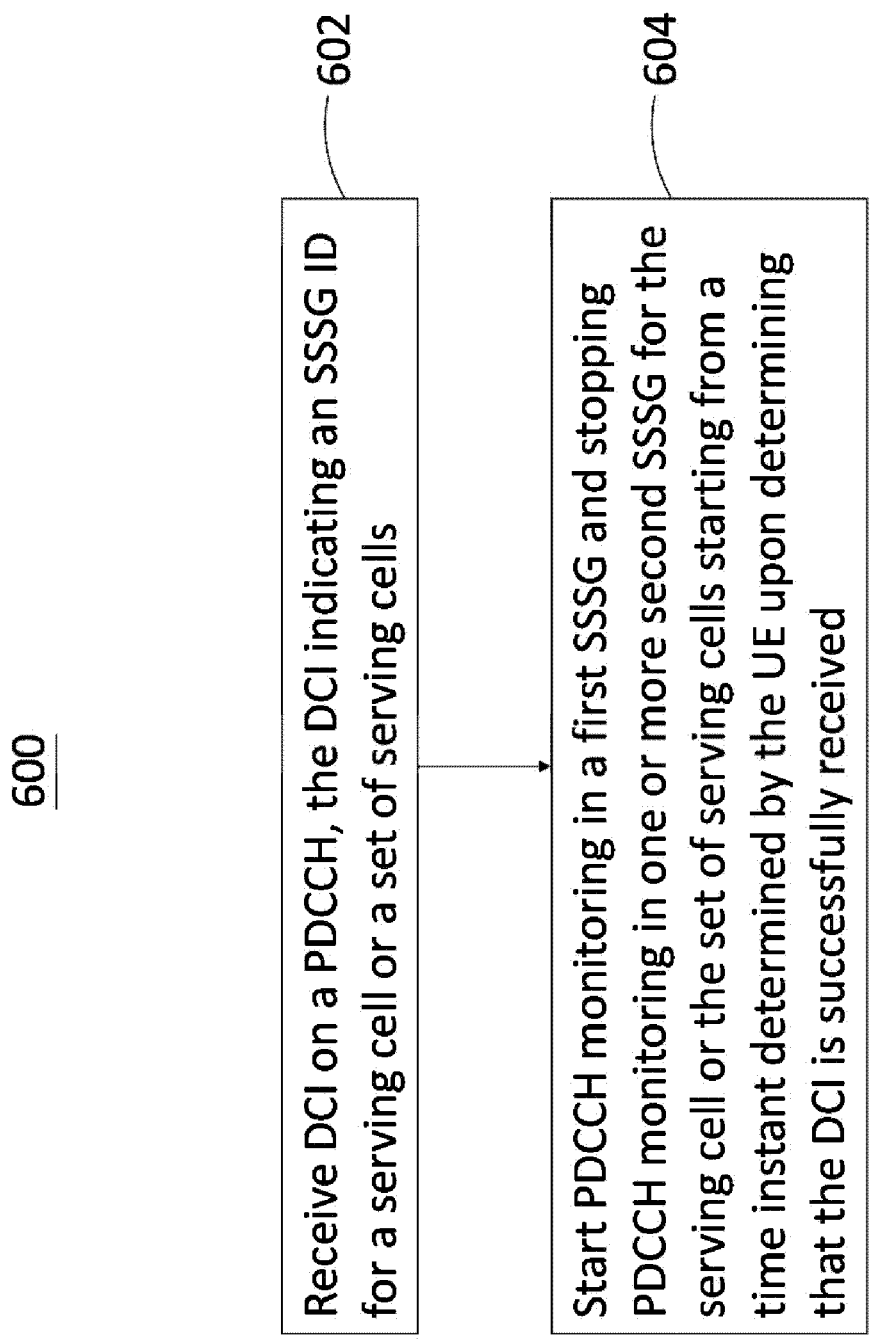
FIG. 6 is a flowchart illustrating a method for power saving performed by a UE according to an example implementation of the present disclosure.

FIG. 6 is a flowchart illustrating a method 600 for power saving performed by a UE according to an example implementation of the present disclosure. In action 602, the UE may receive DCI on a PDCCH, the DCI indicating an SSSG ID for a serving cell or a set of serving cells. In some implementations, the DCI may indicate SSSG switching. In some implementations, the serving cell or the set of serving cells is configured by an RRC parameter associated with SSSG switching or SCell dormancy. In some implementations, the DCI may be monitored in a USS set. In some implementations, the DCI may be one of a DCI format 0_1, a DC format 1_1, a DC format 0_2, and a DC format 1_2.

In action 604, the UE may start PDCCH monitoring in a first SSSG and stop PDCCH monitoring in one or more second SSSG for the serving cell or the set of serving cells starting from a time instant determined by the UE upon determining that the DCI is successfully received. The UE may determine the time instant based on a time offset and the timing of the DCI.

In some implementations, the time instant may include at least a time offset after the last symbol of the PDCCH with the DCI. In some implementations, the time offset may be represented in one of the following units: a symbol with the smallest SCS among the serving cell or the set of serving cells, a symbol with the largest SCS among the serving cell or the set of serving cells, a slot with the smallest SCS among the serving cell or the set of serving cells, a slot with the largest SCS among the serving cell or the set of serving cells, a sub-slot with the smallest SCS among the serving cell or the set of serving cells, a sub-slot with the largest SCS among the serving cell or the set of serving cells, and a millisecond.

The DCI may indicate SSSG switching in various ways. In some implementations, the DCI may indicate the SSSG ID by an information field with n bits, where n is a positive integer determined according to an RRC parameter associated with SSSG switching or SCell dormancy. Each of the n bits corresponds to an SCell group or an SCell dormancy group configured via RRC signaling.

In some implementations, the DCI may include an information field indicating a value associated with the first SSSG, which is the monitored SSSG after SSSG switching.

In some implementations, the DCI may include an information field with n bits, where n is a positive integer determined according to the number of configured SSSGs. The first SSSG is associated with a value of the information field.

In some implementations, the DCI may be a DCI format 2_6. In some implementations, the UE may be configured with a DRX operation. The DCI format 2_6 may be received outside DRX active time. The time instant from which the UE starts PDCCH monitoring in the first SSSG may be during the DRX active time. In some implementations, the time instant is at least a time offset after a start of a DRX cycle. In some implementations, the UE may be configured with a specific RRC parameter with a specific value, which indicates to the UE to monitor the DCI format 2_6 outside the DRX active time. The UE may receive the DCI format 2_6 that indicates SSSG switching outside the DRX active time and start SSSG switching during the DRX active time.

In some implementations, the UE may stop PDCCH monitoring in the one or more second SSSG in at least one currently monitored serving cell and start PDCCH monitoring in a configured default SSSG in a PCell or the at least one currently monitored serving cell upon determining that the DCI format 2_6 is not successfully received or upon a start of a DRX cycle. In some implementations, the UE may not change a currently monitored SSSG upon determining that the DCI format 2_6 is not successfully received or upon a start of a DRX cycle. In some implementations, the UE may start PDCCH monitoring in all serving cells in all configured SSSGs upon determining that the DCI format 2_6 is not successfully received or upon a start of a DRX cycle.

Figure 7:
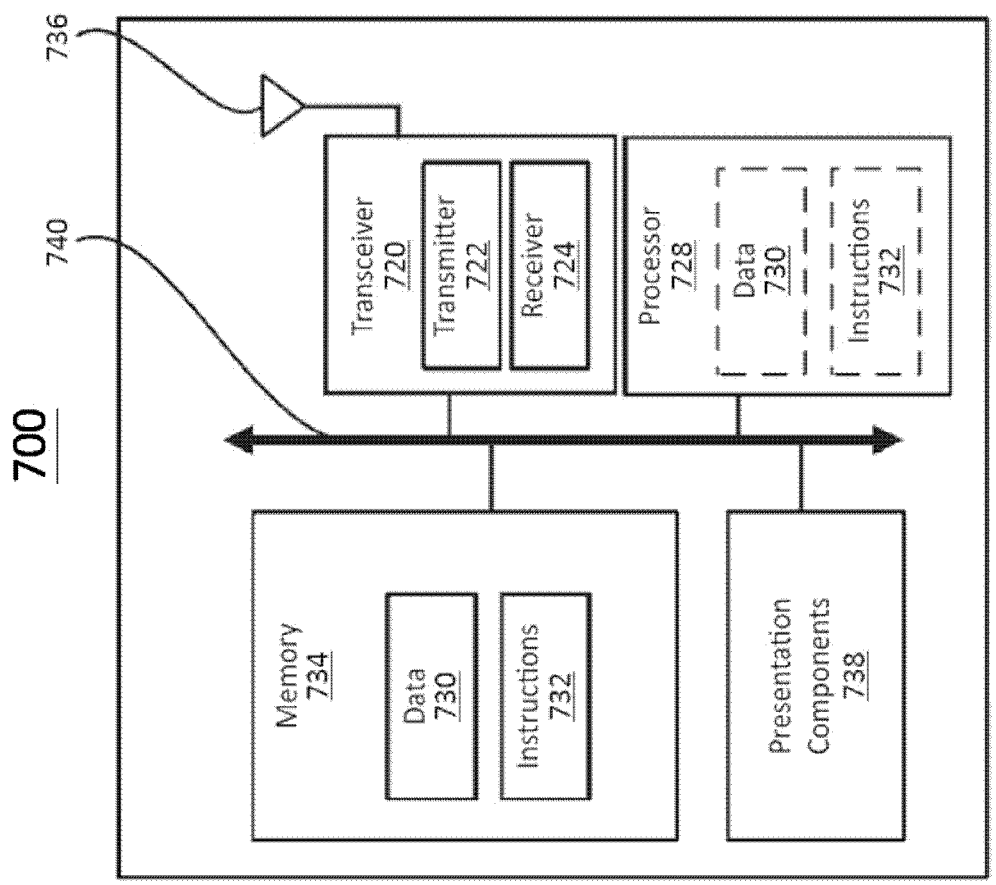
FIG. 7 is a block diagram illustrating a node for wireless communication according to an implementation of the present disclosure.

FIG. 7 is a block diagram illustrating a node 700 for wireless communication according to an implementation of the present disclosure. As illustrated in FIG. 7, a node 700 may include a transceiver 720, a processor 728, a memory 734, one or more presentation components 738, and at least one antenna 736. The node 700 may also include a Radio Frequency (RF) spectrum band module, a BS communications module, a network communications module, and a system communications management module, Input/Output (I/O) ports, I/O components, and a power supply (not illustrated in FIG. 7).

Each of the components may directly or indirectly communicate with each other over one or more buses 740. The node 700 may be a UE or a BS that performs various functions disclosed with reference to FIGS. 1 through 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including but not limited to usable, non-usable and flexibly usable subframes and slot formats. The transceiver 720 may be configured to receive data and control channels.

The node 700 may include a variety of computer-readable media. Computer-readable media may be any available media that may be accessed by the node 700 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 734 may include computer-storage media in the form of volatile and/or non-volatile memory. The memory 734 may be removable, non-removable, or a combination thereof. Example memory includes solid-state memory, hard drives, optical-disc drives, etc. As illustrated in FIG. 7, the memory 734 may store computer-readable, computer-executable instructions 732 (e.g., software codes) that are configured to cause the processor 728 to perform various disclosed functions, for example, with reference to FIGS. 1 through 6. Alternatively, the instructions 732 may not be directly executable by the processor 728 but be configured to cause the node 700 (e.g., when compiled and executed) to perform various disclosed functions.

The processor 728 (e.g., having processing circuitry) may include an intelligent hardware device, e.g., a Central Processing Unit (CPU), a microcontroller, an ASIC, etc. The processor 728 may include memory. The processor 728 may process data 730 and the instructions 732 received from the memory 734, and information transmitted and received via the transceiver 720, the base band communications module, and/or the network communications module. The processor 728 may also process information to be sent to the transceiver 720 for transmission via the antenna 736 to the network communications module for transmission to a core network.

One or more presentation components 738 present data indications to a person or another device. Examples of presentation components 738 include a display device, a speaker, a printing component, and a vibrating component, etc.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art will recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for power saving, the method comprising:
   receiving a configuration indicating a plurality of search space set groups (SSSGs) that includes a first SSSG and one or more second SSSGs, the first SSSG being associated with a first SSSG identifier (ID);
   receiving downlink control information (DCI) on a physical downlink control channel (PDCCH) while monitoring the PDCCH on a UE-specific search space, the DCI including an information field indicating a value associated with the first SSSG ID; and
   starting PDCCH monitoring in the first SSSG and stopping PDCCH monitoring in the one or more second SSSGs from a slot that is at least a time offset after a last symbol of the DCI, wherein:
   a subcarrier spacing (SCS) associated with the time offset is determined by an SCS of a serving cell in which the DCI is received.

2. The method of claim 1, wherein the DCI comprises one of a DCI format 0_1, a DCI format 1_1, a DCI format 0_2, and a DCI format 1_2.

3. The method of claim 1, further comprising:
   starting or restarting a timer upon receiving the DCI; and
   starting the PDCCH monitoring in an SSSG associated with ID 0 upon expiration of the timer.

4. The method of claim 1, wherein a unit of the time offset is symbol.

5. The method of claim 1, wherein:
   the information field has n bits, and
   n is a positive integer determined based on a radio resource control (RRC) parameter associated with SSSG switching.

6. The method of claim 1, wherein:
   the information field has n bits, and
   n is a positive integer determined based on a number of configured SSSGs.

7. A user equipment (UE) for power saving, the UE comprising:
   at least one processor; and
   at least one non-transitory computer-readable medium coupled to the at least one processor and storing one or more computer-executable instructions that, when executed by the at least one processor, cause the UE to:
   receive a configuration indicating a plurality of search space set groups (SSSGs) that includes a first SSSG and one or more second SSSGs, the first SSSG being associated with a first SSSG identifier (ID);
   receive downlink control information (DCI) on a physical downlink control channel (PDCCH) while monitoring the PDCCH on a UE-specific search space, the DCI including an information field indicating a value associated with the first SSSG ID; and
   start PDCCH monitoring in the first SSSG and stop PDCCH monitoring in the one or more second SSSGs from a slot that is at least a time offset after a last symbol of the DCI, wherein:
   a subcarrier spacing (SCS) associated with the time offset is determined by an SCS of a serving cell in which the DCI is received.

8. The UE of claim 7, wherein the DCI comprises one of a DCI format 0_1, a DCI format 1_1, a DCI format 0_2, and a DCI format 1_2.

9. The UE of claim 7, wherein the one or more computer-executable instructions, when executed by the at least one processor, further cause the UE to:
   start or restart a timer upon receiving the DCI; and
   start the PDCCH monitoring in an SSSG associated with ID 0 upon expiration of the timer.

10. The UE of claim 7, wherein a unit of the time offset is symbol.

11. The UE of claim 7, wherein:
    the information field has n bits, and
    n is a positive integer determined according to a radio resource control (RRC) parameter associated with SSSG switching.

12. The UE of claim 7, wherein:
the information field has n bits, and
n is a positive integer determined according to a number of configured SSSGs.

* * * * *